US012121493B2

(12) United States Patent
Lampe et al.

(10) Patent No.: US 12,121,493 B2
(45) Date of Patent: Oct. 22, 2024

(54) SYSTEM AND METHOD FOR OPTIMIZATION OF CPR CHEST COMPRESSIONS

(71) Applicants: The Feinstein Institutes for Medical Research, Manhasset, NY (US); ZOLL Medical Corporation, Chelmsford, MA (US)

(72) Inventors: Joshua Lampe, Groton, MA (US); Christopher L. Kaufman, Golden, CO (US); Lance Becker, Manhasset, NY (US)

(73) Assignees: THE FEINSTEIN INSTITUTES FOR MEDICAL RESEARCH, Manhasset, NY (US); ZOLL MEDICAL CORPORATION, Chelmsford, MA (US)

( * ) Notice: Subject to any disclaimer, the term of this patent is extended or adjusted under 35 U.S.C. 154(b) by 748 days.

(21) Appl. No.: 16/994,362

(22) Filed: Aug. 14, 2020

(65) Prior Publication Data

US 2021/0045967 A1 Feb. 18, 2021

Related U.S. Application Data

(60) Provisional application No. 62/887,705, filed on Aug. 16, 2019.

(51) Int. Cl.
*A61H 31/00* (2006.01)

(52) U.S. Cl.
CPC ......... *A61H 31/005* (2013.01); *A61H 31/007* (2013.01); *A61H 2201/0188* (2013.01);
(Continued)

(58) Field of Classification Search
CPC ................ A61H 31/005; A61H 31/007; A61H 2201/0188; A61H 2201/5007;
(Continued)

(56) References Cited

U.S. PATENT DOCUMENTS

| | | | | | |
|---|---|---|---|---|---|
| 5,554,103 | A * | 9/1996 | Zheng | A61H 31/00 | 600/311 |
| 5,843,007 | A * | 12/1998 | McEwen | A61H 9/0078 | 601/149 |

(Continued)

OTHER PUBLICATIONS

Zhang et al., "A mechanical chest compressor closed-loop controller with an effective trade-off between blood flow improvement and ribs fracture reduction", Med. Biol. Eng. Comput., 53: 487-497, 2015.

*Primary Examiner* — Colin W Stuart
*Assistant Examiner* — Matthew D Ziegler
(74) *Attorney, Agent, or Firm* — Mintz Levin Cohn Ferris Glovsky and Popeo, P.C.

(57) ABSTRACT

A system for assisting with a chest compression treatment being administered to a patient. In one aspect, the system for assisting with chest compression treatment includes at least one sensor configured to measure blood flow data, one or more processors, in communication with the at least one sensor, and an output device configured to provide the output indication to the rescuer. The one or more processors are configured to perform operations including receiving the blood flow data from the at least one sensor, based on the blood flow data, generating arterial blood flow data and venous blood flow data, providing an estimation of chest compression effectiveness based on the arterial blood flow data and the venous blood flow data, the estimation being based on at least one peak comparison of arterial blood flow and venous blood flow, and generating an output indication of the estimation of chest compression effectiveness.

54 Claims, 11 Drawing Sheets

(52) U.S. Cl.
CPC ................ *A61H 2201/5007* (2013.01); *A61H 2201/5043* (2013.01); *A61H 2201/5092* (2013.01); *A61H 2230/20* (2013.01); *A61H 2230/25* (2013.01)

(58) Field of Classification Search
CPC .... A61H 2201/5043; A61H 2201/5092; A61H 2230/20; A61H 2230/201; A61H 2230/208; A61H 2230/25; A61H 2230/255; A61H 2230/305
See application file for complete search history.

(56) References Cited

U.S. PATENT DOCUMENTS

| | | | | |
|---|---|---|---|---|
| 6,373,573 | B1 * | 4/2002 | Jung | A61B 5/4547 356/419 |
| 7,074,177 | B2 * | 7/2006 | Pickett | A61H 31/006 600/16 |
| 9,039,180 | B2 * | 5/2015 | Brown, Jr. | A61B 3/0025 351/208 |
| 9,861,311 | B2 * | 1/2018 | Freeman | A61B 5/0538 |
| 10,596,064 | B2 * | 3/2020 | Kaufman | A61H 31/005 |
| 10,729,615 | B2 * | 8/2020 | Taylor | A61H 31/008 |
| 10,765,593 | B2 * | 9/2020 | Reeves | A61H 9/0078 |
| 10,791,943 | B2 * | 10/2020 | Salamon | A61B 5/6828 |
| 10,918,354 | B2 * | 2/2021 | Nichol | A61H 31/005 |
| 2007/0027386 | A1 * | 2/2007 | Such | A61B 5/0006 600/509 |
| 2011/0166490 | A1 | 7/2011 | Woerlee et al. | |
| 2015/0283027 | A1 * | 10/2015 | Lampe | A61H 31/005 601/41 |
| 2016/0143805 | A1 * | 5/2016 | Aelen | A61B 5/021 601/41 |
| 2016/0206504 | A1 * | 7/2016 | Giarracco | A61B 5/14551 |

* cited by examiner

SYSTEM AND METHOD FOR OPTIMIZATION OF CPR CHEST COMPRESSIONS

TECHNICAL FIELD

This document relates to assisting a cardio-pulmonary resuscitation (CPR) treatment, including systems and techniques for determining the effectiveness of CPR.

BACKGROUND

CPR is a treatment for patients experiencing cardiac arrest in which chest compressions and ventilation is applied to the chest of a victim. According to the 2015 American Heart Association Guidelines for Cardiopulmonary Resuscitation and Emergency Cardiovascular Care, it is recommended to perform chest compressions at a compression rate of between 100 and 120 chest compressions per minute (cpm) and at a compression depth of between 2.0-2.4 inches. Commercially available CPR feedback devices, as well as mechanical chest compression devices, typically implement clinically recommended protocols.

SUMMARY

In one aspect, a system for managing a chest compression treatment to a patient in need of emergency assistance by a rescuer includes at least one sensor configured to measure blood flow data, one or more computer executable media including instructions, one or more processors, in communication with the at least one sensor, and an output device configured to provide the output indication to the rescuer. The one or more processors are configured to execute the instructions by performing operations including receiving the blood flow data from the at least one sensor, based on the blood flow data, generating arterial blood flow data and venous blood flow data, providing an estimation of chest compression effectiveness based on the arterial blood flow data and the venous blood flow data, the estimation being based on at least one peak comparison of arterial blood flow and venous blood flow, and generating an output indication of the estimation of chest compression effectiveness.

In some implementations, the at least one peak comparison of arterial blood flow and venous blood flow includes a comparison of an arterial peak of an arterial blood flow waveform corresponding to a chest compression period and a venous peak of a venous blood flow waveform corresponding to the chest compression period. The comparison of the arterial peak to the venous peak includes a time difference between the peaks. The operations can include: based on the estimation, determining whether the forward blood flow meets a criterion based on the comparison of the arterial peak to the venous peak. Determining whether the forward blood flow meets the criterion can include determining whether the arterial peak occurs before the venous peak. The criterion can include a comparison with a threshold. The threshold can include a time delay value, a chest compression efficiency metric, or a volumetric flow rate value. The at least one sensor can include at least one of a photoplethysmographic sensor, an ultrasound sensor, or a blood flow sensor. The at least one sensor can be configured to identify oxygenated blood data and de-oxygenated blood data, the oxygenated blood data being used to generate the arterial blood flow data and the deoxygenated blood data being used to generate the venous blood flow data. The system can include a 750 nm light-emitting diode (LED) for a venous target having a first absorbance is dominated by de-oxy hemoglobin, and a 850 nm LED for a 850 nm an arterial target having a second absorbance is dominated by oxy-hemoglobin. The first absorbance and the second absorbance can be measured using a computer-controlled spectrometer coupled to a fiber optic cable and collimating lens. The LEDs and fiber optic collimating lens can be affixed to the patient at a set distance from one another. The distance can be approximately 1 cm. The computer-controlled spectrometer operates at approximately 256 samples per second. The system can be configured to be coupled to a defibrillator or a mechanical chest compression device connected to the patient.

In other aspect, a method of detecting net forward blood flow during cardiopulmonary resuscitation (CPR) in a patient includes: receiving, by one or more processors and from at least one sensor, blood flow data, based on the blood flow data, generating, by the one or more processors, arterial blood flow data and venous blood flow data, providing, by the one or more processors, an estimation of forward blood flow based on the arterial blood flow data and the venous blood flow data, the estimation being based on at least one peak comparison of arterial blood flow and venous blood flow, generating, by the one or more processors, an output indication of the estimation of forward blood flow, and providing, by the one or more processors, the output indication to be displayed to the rescuer.

In some implementations, the arterial blood flow data and the venous blood flow data are simultaneously measured at an upper circulatory system location and at a lower upper circulatory system location. The arterial and venous blood volumes can be measured using a photoplethysmographic sensor, an ultrasound sensor, or a blood flow sensor. A net forward blood flow indicates that the chest compressions are effective. Based on the estimation, it can be determined whether the forward blood flow meets a criterion based on the comparison of the arterial peak to the venous peak. In response to determining whether the forward blood flow meets the criterion, adjusting a compression rate, a compression depth or a compression. The net forward blood flow can be improved by applying chest compressions to the patient below a ringing frequency corresponding to patient's blood flow oscillations.

In other aspect, a system for managing a chest compression treatment to a patient in need of emergency assistance by a rescuer includes: at least one sensor configured to measure blood volume data, one or more computer executable media comprising instructions, one or more processors, in communication with the at least one sensor, configured to execute the instructions by performing multiple operations, and an output device configured to provide the output indication to the rescuer. The operations include: receiving the blood volume data from the at least one sensor, based on the blood volume data, generating oxygenated blood volume data and de-oxygenated blood volume data, providing an estimation of chest compression effectiveness based on the oxygenated blood volume data and the de-oxygenated blood volume data, the estimation being based on at least one peak comparison of oxygenated blood volume and de-oxygenated blood volume, and generating an output indication of the estimation of chest compression effectiveness.

In some implementations, the operations can include: determining whether a cardiac activity was restored during the chest compression treatment. Determining whether the cardiac activity was restored can include: identifying peaks of the oxygenated blood volume data, and determining an absence of peaks of the de-oxygenated blood volume data that correspond to the identified peaks of the oxygenated blood volume data. The at least one peak comparison of oxygenated blood volume and de-oxygenated blood volume can include a comparison of a peak of an oxygenated blood volume waveform corresponding to a chest compression period and a peak of a de-oxygenated blood volume waveform corresponding to the chest compression period. The comparison of the peak of the oxygenated blood volume waveform to the peak of the de-oxygenated blood volume waveform can include a time difference between the peaks. The operations can include: based on the estimation, determining whether the forward blood flow meets a criterion based on the comparison of the peak of the oxygenated blood volume waveform to the peak of the de-oxygenated blood volume waveform. Determining whether the forward blood flow meets the criterion can include determining whether the peak of the oxygenated blood volume waveform occurs before the peak of the de-oxygenated blood volume waveform. The criterion can include a comparison with a threshold. The threshold can include a time delay value, a chest compression efficiency metric, or a volumetric flow rate value. The at least one sensor can include a photoplethysmographic sensor, an ultrasound sensor, and/or a blood flow sensor. The at least one sensor is configured to identify oxygenated blood data and deoxygenated blood data. The system can include: a 750 nm light-emitting diode (LED) for a venous target having a first absorbance is dominated by de-oxy hemoglobin, and a 850 nm LED for a 850 nm an arterial target having a second absorbance is dominated by oxy-hemoglobin. The first absorbance and the second absorbance are measured using a computer-controlled spectrometer coupled to a fiber optic cable and collimating lens. The LEDs and fiber optic collimating lens are affixed to the patient at a set distance from one another. The computer-controlled spectrometer sample rates operates at approximately 256 samples per second. The system is configured to be coupled to a defibrillator or a mechanical chest compression device connected to the patient. The operations can include: receiving the blood flow data from the at least one sensor, based on the blood flow data, generating arterial blood flow data and venous blood flow data, providing an estimation of chest compression effectiveness based on the arterial blood flow data, the venous blood flow data, the oxygenated blood volume data, and the de-oxygenated blood volume data. The output indication can include feedback for the rescuer of chest compression effectiveness displayed on a screen of a medical device.

In other aspect, a method of detecting net forward blood flow during cardiopulmonary resuscitation (CPR) in a patient includes: receiving, by one or more processors and from at least one sensor, blood volume data, based on the blood volume data, generating, by the one or more processors, oxygenated blood volume data and de-oxygenated blood volume data, providing, by the one or more processors, an estimation of forward blood flow based on the oxygenated blood volume data and the de-oxygenated blood volume data, the estimation being based on at least one peak comparison of oxygenated blood volume and de-oxygenated blood volume, generating, by the one or more processors, an output indication of the estimation of forward blood flow, and providing, by the one or more processors, the output indication to be displayed to the rescuer.

In some implementations, the oxygenated blood volume data and the de-oxygenated blood volume data are simultaneously measured at an upper circulatory system location and at a lower upper circulatory system location. The oxygenated and de-oxygenated blood volume data are measured using a photoplethysmographic sensor, an ultrasound sensor, or a blood flow sensor. A net forward blood flow indicates that the chest compressions are effective. The method can include: based on the estimation, determining whether the forward blood flow meets a criterion based on the comparison of an oxygenated blood volume peak to a de-oxygenated blood volume peak. The method can include: in response to determining whether the forward blood flow meets the criterion, adjusting a compression rate or a compression depth. The net forward blood flow can be improved by applying chest compressions to the patient below a ringing frequency corresponding to patient's blood flow oscillations.

The details of one or more implementations are set forth in the accompanying drawings and the description below. Other features and advantages will be apparent from the description, drawings, and claims.

DETAILED DESCRIPTION

Figure 1:
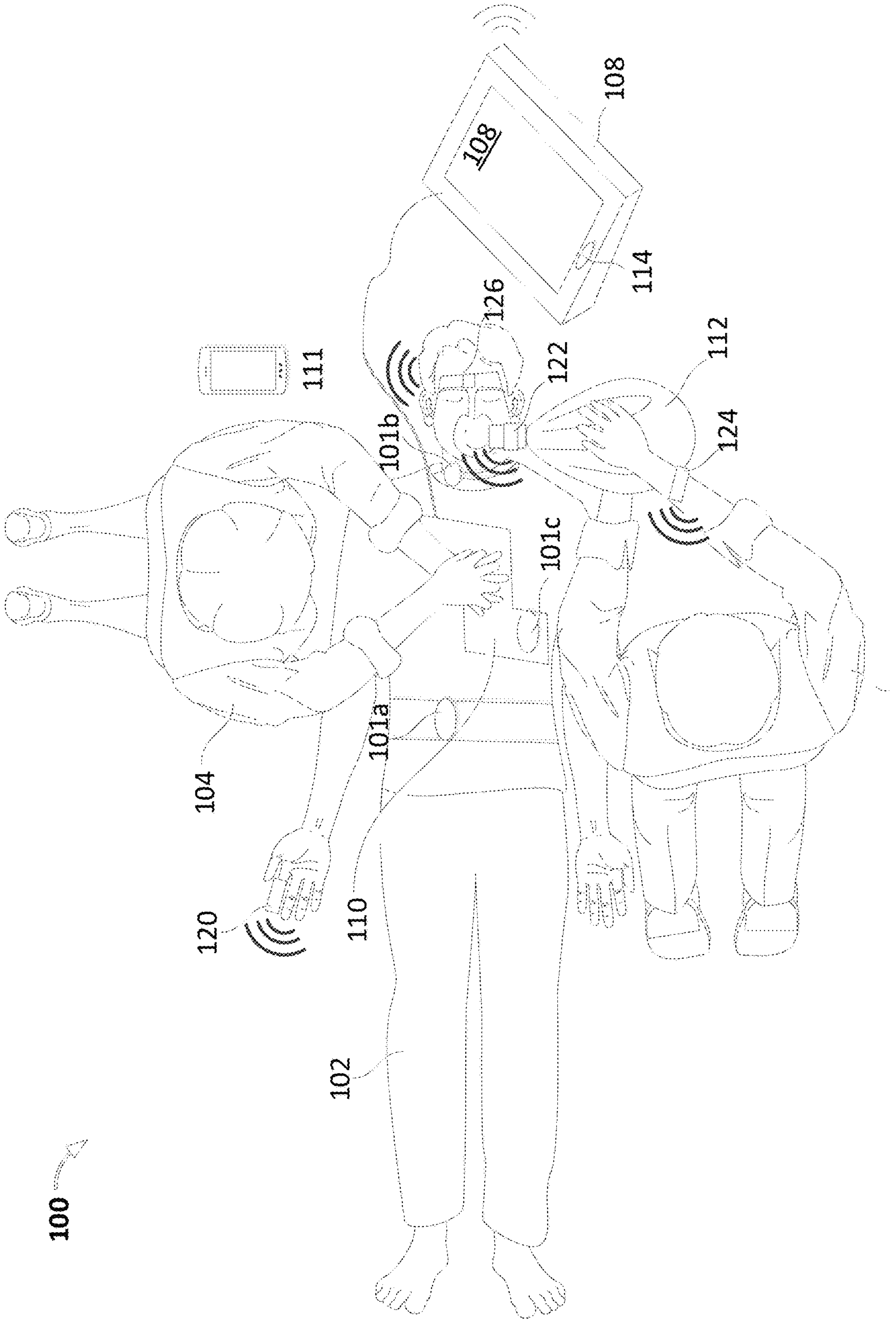
FIG. 1 is a schematic illustration of an example system for assisting with a chest compression treatment.

A person who is attempting to use chest compressions to rescue a patient experiencing cardiac arrest typically applies force to the patient's chest as part of chest compression treatment. The person (whom we sometimes call a rescuer, or user) may use a device to assist with the chest compression treatment. Among other functionalities, the device can provide feedback to the rescuer about chest compression parameters (e.g., compression depth and compression rate) based on which the rescuer could optimize chest compression treatment. Typically, the feedback devices, such as those available commercially today, provide feedback to the rescuer based on the chest compression rate clinically recommended. However, it may be advantageous to provide an indication of how to optimize one or more chest compression parameters (e.g., a rate of compressions that is most likely to contribute to patient survivability) based on ongoing conditions over the course of the treatment. Thus, a feedback device can be configured to indicate an adjustment of the chest compression parameters (e.g., compression rate, compression depth, compression waveform, etc.) over the course of the chest compression treatment. The adjustment in chest compression parameters can be based on the time since chest compression treatment was started or based on a particular parameter. In various embodiments, blood flow or pressure features or metrics are used to adjust the rate and/or depth of chest compressions. Examples of such features or metrics may include blood pressure, blood flow, blood velocity, vascular response, pulse arrival time, —etc in both the arteries and the veins. The amount of time elapsed since the chest compression treatment commenced may also be used to adjust the compression rate or other compression parameters.

When the heart is functioning properly, the intricate structure and coordination of cardiac muscle stimulation and valve actuation is remarkably effective in transporting and regulating the blood flow away from the heart via the arteries and toward the heart via the veins. The peripheral blood flows in a single direction, from the left ventricle of the heart, through the arteries, through the capillaries, through the veins, and back to the right atrium of the heart. While the complete physical description of blood flow is complex, many clinically relevant features of systemic blood flow during normal heart function can be reasonably described using the fluid mechanics concept of potential driven flow, which allows, as an example, the use of Ohm's law to relate the arterio-venous pressure drop to the cardiac output and the peripheral resistance (Pressure=Cardiac Output*R_peripheral). The arterial portion of the cardiovascular system has a higher pressure and the blood volume in arterial portion of the cardiovascular system oscillates slightly with each heartbeat, filling during the contraction of the left ventricle and draining between each contraction. The venous portion of the cardiovascular system has a significantly lower pressure and the venous volume, particularly in the tissues, does not exhibit the oscillations related to the heartbeat (the oscillations that appear in the healthy venous flow being mostly associated with breathing). A key feature of normal cardiac function is that the heartbeat does not result in a pressure wave or a volume increase in the venous portion of the cardiovascular system. Healthy cardiovascular system presents an effective autoregulation mechanism, to regulate local blood flow. Cardiovascular autoregulation provides the intrinsic ability to maintain a constant blood flow despite changes in perfusion pressure. For example, if perfusion pressure is decreased in a segment of the cardiovascular system, blood flow initially decreases, then returns toward normal levels within minutes. This autoregulatory response can be controlled by metabolic, myogenic, and endothelial mechanisms.

In case of cardiac arrest, the cardiovascular system is unable to properly perfuse blood and regulate the blood flow. Referring to above discussion regarding pressure differences between arterial and venous portions of the cardiovascular system, during untreated cardiac arrest, the pressure throughout the cardiovascular system equilibrates. The cardiovascular pressure equilibrium results in a loss of arterial blood pressure and an increase in venous blood pressure, which is caused in part by the movement of blood volume from the arterial portion of the cardiovascular system to the venous portion of the cardiovascular system. Cardiovascular pressure equilibrium, during cardiac arrest results in the arterial blood pressure and the venous blood pressure being nearly identical. Once blood pressures equilibrate, the simplifications allowed by the concept of potential driven flow are no longer reasonable. During cardiac arrest, clinically relevant features of the cardiovascular system are more accurately captured by the concept of impedance driven flow. Two key assumptions are relaxed in the impedance driven flow model relative to the potential driven flow model: 1) the pressure gradient in a blood vessel does not have to be constant, and 2) blood does not necessarily flow in the direction of the pressure gradient.

As discussed herein, chest compressions are recommended to treat cardiac arrests. However, the intrinsic hemodynamics resulting from chest compressions are substantially different from that of a properly functioning cardiovascular system. For example, the sudden positive rise in intrathoracic pressure can cause blood to flow away from the heart via both the arteries and the veins; that is, a chest compression may result in blood flow through the veins in a direction opposite to that of the intended physiological design. Further, the blood flow oscillates back and forth within a vessel during chest compressions. In addition, there is a substantial pressure and volume increase in the venous side of the cardiovascular system, the magnitudes of which are substantially equivalent to the pressure and volume increase of the arterial side of the system. Despite such inefficiency as compared to healthy cardiovascular functionality, the amount of positive forward blood flow caused by chest compressions is better than no blood flow at all. Embodiments of the present disclosure relate to the ability to estimate the degree of effectiveness of chest compressions based on measures of arterial blood flow as compared with measures of venous blood flow resulting from the chest compressions. The estimation of the degree of effectiveness of chest compressions may be useful for a rescuer applying chest compressions to a patient experiencing cardiac arrest in modifying or maintaining the manner, in which chest compressions are applied, to induce a more effective forward blood movement. Accordingly, embodiments of the present disclosure make it possible to compare the relative volumes of blood being moved by the chest compressions on the arterial and venous side of the chest compression and further make it possible to determine if the blood pressure wave on the arterial side of the cardiovascular system arrived at the tissue before, co-incident with, or after the blood pressure wave on the venous side of the system on a compression by compression basis. Knowledge about the relative sizes of the blood volumes being moved by a compression and the difference in their arrival times at the tissue of interest will make it possible to determine if a chest compression is effectively resulting in tissue perfusion.

In some implementations, and as discussed herein, a provider of chest compressions may use an indication of the effectiveness of chest compressions as feedback of the manner in which the chest compressions are given to adjust or maintain the chest compression parameters. The indication of effectiveness of chest compressions may incorporate data from one or more sensors (e.g., photoplethysmography sensor, ultrasound sensor, blood pressure sensor, etc.). Chest compression sensors can be used to measure and collect data related to blood flow through one or more arterial and/or venous vessels of the body resulting from the chest compressions. The blood flow data may be analyzed by one or more processors to provide an estimate of arterial blood flow (e.g., represented as an arterial flow waveform) and an estimate of venous blood flow (e.g., represented as a venous flow waveform), resulting from the chest compressions. The processor(s) may compare the respective estimates of blood flow through the arteries and the veins resulting from a chest compression to provide a further estimation of forward blood flow, so as to give the user an indication of effectiveness of chest compressions.

In some implementations, such a comparison may involve comparing the time at which a peak in the arterial flow waveform corresponding to a chest compression to the time at which a peak in the venous flow waveform corresponding to the same chest compression occurs. In some examples, chest compressions with the arterial flow waveform peaks occurring before the negative inverted venous flow waveform peaks may be considered more effective than, for example, the opposite case (chest compressions resulting in the peak in the venous flow waveform occurring before the peak in the arterial flow waveform). Further, it may be considered that a chest compression is even more hemodynamically effective when the time period in which the peak in the arterial flow waveform occurs before the peak in the venous flow waveform is greater.

FIG. 1 illustrates an example patient monitoring configuration 100. The patient monitoring configuration 100 includes one or more sensors 101*a* and 101*b* that can be attached to various locations on the body surface of the patient 102. The sensors 101*a*, 101*b*, 101*c* can be electrically coupled to a patient monitoring device 108 (e.g., a defibrillator), which provides output for a rescuer 104. The rescuer 104 can perform chest compression treatment on a victim or patient 102 (the terms are used interchangeably here to indicate a person who is the subject of intended or actual chest compression and related treatment, or other medical treatment), such as an individual who has apparently undergone sudden cardiac arrest.

The emergency care scene 100 can be, for instance, at the scene of an accident or health emergency, in an ambulance, in an emergency room or hospital, or another type of emergency situation. The rescuer 104 can be, for instance, a civilian responder with limited or no training in lifesaving techniques; a first responder, such as an emergency medical technician (EMT), police officer, or firefighter; or a medical professional, such as a physician or nurse. The rescuer 104 may be acting alone or may be acting with assistance from one or more other rescuers, such as a partner EMT 106. In the example of FIG. 1, the rescuer 104 is delivering chest compressions to the patient 102 and the rescuer 106 is delivering ventilations to the patient using a ventilator 112.

In this illustration, the rescuers 104, 106 can deploy a patient monitoring device 108 to monitor and to treat the patient 102. The patient monitoring device 108 is connected to electrode pads 110 intended to be placed on the patient's chest via one or more cables. The patient monitoring device 108 provides monitoring and treatment to the patient 102 as appropriate through the electrode pads 110. In some examples, the patient monitoring device 108 can instruct one or more of the rescuers 104 in providing chest compressions or other treatment to the patient 102. The rescuers 104, 106 can use mobile devices 111, such as smartphones, tablets, or wearable devices (e.g., watches or glasses) to assist in treating the patient 102. For instance, a mobile device 111 can provide prompting to assist a rescuer in delivering chest compressions, ventilations, mouth-to-mouth resuscitation, defibrillation, or other treatments to the patient 102. A supervisor can use a mobile device 111 to coordinate treatment provided by the multiple rescuers 104, 106. Computing devices, such as laptop computers or computing devices integrated into an ambulance, can be used to analyze health data about the patient or data indicative of treatment delivered to the patient or to communicate such data to a remote location (e.g., a dispatch center, an emergency room, or a remote server).

One or more sensors (e.g., sensors 101*a*, 101*b*, 101*c*, 120, 122, 126 in the example of FIG. 1) can be used to monitor the patient 102. For instance, the sensors 101*a*, 101*b* can include a sensor for measuring a parameter indicative of a blood flow or pressure waveform of the patient 102 and a chest compression sensor for determining the rate and/or depth of chest compressions. In some implementations, the blood flow or pressure waveform features or metrics can include a vascular parameter, such as a blood flow, a pulse wave velocity, a blood pressure, flow velocity, hemodynamic power, etc. In some implementations, the sensors 101*a* and 101*b* can include photoplethysmographic sensors, a tonometer, a laser Doppler blood flow sensor, an ultrasound Doppler blood flow sensor, a blood pressure sensor, and/or other sensor for measuring a blood flow or pressure waveform feature or metric. In some implementations, a sensor(s) 101*c* can be used to determine and/or provide feedback relating to chest compression rate and can include a motion sensor (e.g., accelerometer or magnetic flux motion sensor), which may be configured to analyze motion signals such as an accelerometer signal that may be used to provide measures of compression depths and compression rates exerted by the user 104 of the system 100. In some examples, sensors 120, 122, 126 monitor parameters indicative of the patient's health status, e.g., physical parameters such as the patient's heart rate, electrocardiogram (ECG), blood pressure, temperature, respiration rate, blood oxygen level, end-tidal carbon dioxide level, pulmonary function, blood glucose level, or other parameters indicative of the patient's health status. Some sensors, such as heart rate or ECG sensors, can be included in pads 110 of the patient monitoring device 108. One or more sensors (e.g., a sensor 124 in the example of FIG. 1) can monitor the treatment delivered to the patient 102. For instance, the sensor 124 can monitor shocks delivered to the patient 102 by the patient-monitoring device 108; a rate, depth, or duration of compressions delivered to the patient 102; or other parameters indicative of treatment delivered to the patient. Some sensors can monitor both parameters indicative of the patient's health status and parameters indicative of the chest compression treatment delivered to the patient. The sensors 101*a*, 101*b*, 101*c*, 120, 122, 126 can provide information about the patient's health status or information about the treatment delivered to the patient by the patient monitoring device 108, one or more of the mobile devices 111, or other computing devices at the emergency care scene 100 or to remote computing devices.

The portion of the body surface of the patient 102 selected for attaching the sensors 101*a*, 101*b*, 120 that monitor a parameter indicative of a blood flow or pressure waveform responsive to chest compression can depend on the type of the selected sensor or sensors and the imaging target (e.g., inferior vena cava, carotid artery, jugular vein, renal artery, brachial artery, femoral artery or abdominal aorta). Example portions of the body surface of the patient 102 that can be selected for attaching the sensors 102 include the chest, the neck, the abdomen, the limb, etc.

The sensors 101*a*, 101*b*, 101*c*, 120, 122, 126 can be electrically coupled to the patient monitoring device 108. An example of a patient monitoring device 108 can be a standard chest compression monitoring device, a portable chest compression monitoring device, a defibrillator, a smartphone, a personal digital assistant (PDA), a laptop, a tablet personal computer (PC), a desktop PC, a set-top box, an interactive television, and/or combinations thereof or any other type of medical device capable to record and process chest compression signals and physiologic parameters. For example, the sensors 101*a* and 101*b* can be implemented in or coupled to standard medical devices, such as X-Series monitors and defibrillators produced by ZOLL Medical®, Chelmsford MA In some implementations, the patient monitoring device 108 communicates with an external device (e.g., a device that can operate independent of the patient monitoring device 108). For example, the external device may include user interface functionality, and information communicated by the patient monitoring device 108 can be provided to a user by way of the user interface functionality (e.g., displayed on a display). The external device can be any appropriate device, such as a laptop, tablet computer, smartphone, smartwatch, or any of the other electronic devices mentioned above.

In some implementations, the patient monitoring device 108 includes a photoplethysmographic system configured for chest compression monitoring and optimization of chest compression treatment. The photoplethysmographic system can be configured to perform an optical technique for detecting blood volume changes in (arterial and venous) blood vessels to optimize a chest compression treatment. The photoplethysmographic system can include a detection system and an emission system attached or adjacent to the detection system. The detection system includes one or more detectors, such as sensors 101*a*, 101*b*, 120 that are configured to detect the light that is absorbed or reflected by particular blood particles in peripheral tissue or target blood vessels ("reflectance photoplethysmography"). The photoplethysmographic system can be configured to emit light that is used to illuminate or trans-illuminate tissue for the purpose of measuring blood analytes or other hemodynamic or tissue properties. The photoplethysmographic system can inject light into living tissue and the light, which is not absorbed by the tissues, is detected a short distance from the entry point. The detected light is converted into an electronic signal, indicative of the received light signal from the tissue. This electronic signal is then used to calculate one or more physiologic parameters such as arterial blood oxygen saturation, heart rate, cardiac output, or tissue perfusion. Other blood analytes that may be measured by the photoplethysmographic system include the percentages of oxy-hemoglobin, carboxyhemoglobin, methemoglobin, and reduced hemoglobin in the arterial blood. The emission system includes electronic components, such as one or more emitters that are configured to direct light towards target blood vessels. For example, the photoplethysmographic system includes one or more light-emitting diodes (LEDs), a programmable microcontroller to individually control LED intensity, a computer-controlled spectrometer coupled to a fiber optic cable and collimating lens. The LEDs, the fiber optic, and the collimating lens can be arranged in the proximity of the patient 102 at a particular distance from one another (e.g., approximately within 1 cm from each other). In some implementations, the photoplethysmographic system includes an elastomeric sleeve configured to maintain at least a portion of the emission system and the detection system proximal to a particular area of the patient 102 (e.g., figure tip, neck, thorax, or abdomen).

In some implementations, the LEDs can include a 750 nm light-emitting diode for a 750 nm target, for which absorbance is dominated by de-oxy hemoglobin, a 810 nm LED for a 808 nm target, which is the isosbestic point for hemoglobin, and a 850 nm LED for a 850 nm target, for which absorbance is dominated by oxyhemoglobin. The spectrometer can be configured to have a sample rate higher than about 256 samples per second. In some implementations, the photoplethysmographic system can include a photodiode and light timing in a manner similar to current pulse oximetry technology, instead of fiber optic collection of data with a spectrophotometer.

In the illustrated example, the patient monitoring device 108 is configured to display a feedback to the user. The feedback can include a substantially real-time report of the ongoing chest compression and/or a recommendation to modify the chest compression protocol (e.g., chest compression rate). The feedback can be based on a physiologic parameter and a chest compression waveform that are acquired via the sensors 101*a* and 101*b* and processed by the device 108. The physiologic parameter can depict vascular tone of the patient undergoing chest compression treatment. Examples of such physiologic parameters can include blood flow, pulse wave velocity, blood pressure in a particular artery and/or vein, etc. The chest compression waveform can depict the variation of compression displacement and compression rate (for example, a numerical value of the average compression rate determined for a window of chest compressions) over time.

The monitoring device 108 enables user input via the user interface 109 and additional control buttons 114. In some implementations, the control buttons 114 can enable a user to select one of a plurality of available modes (e.g., display modes, or other types of output modes, such as audio output modes) of the user interface 109. In some implementations, the graphical user interface 109 can be configured to operate in one of multiple modes, depending on the level of sophistication of the user of the monitoring device 108. For example, a first mode can be tailored to a medical professional with any level of training, or a non-medical professional, and may not display detailed data (e.g., data received from the sensors such as data describing the physiologic parameter). Instead, the first mode can provide plain-language instructions that would be understandable by a medical professional or a non-medical professional, such as the instructions shown in the output of the monitoring device 108.

A second mode of the graphical user interface 109 can provide more detailed information, such as information that may be of interest to a medical professional having a training about data provided by the sensors 101*a*, 101*b*. The second mode can include the display of the physiologic parameters indicative of the blood flow or pressure waveform and/or the chest compression waveform. For example, the physiologic parameter and the chest compression waveform may be used by a clinician in administration and optimization of chest compression treatment.

In some implementations, the control buttons 114 can enable a user to initiate, stop or modify particular actions that can be performed by the patient monitoring device 108. Actions that can be initiated, stopped or modified by using the buttons 114 can include the selection of processing method, selection of an alarm threshold, suspension of alarm, recording of data, and transmitting data over the network to a remote device. In general, the user interface 109 can be implemented by one or more modules of the monitoring device 108 (e.g., physical devices including processors, software such as executable code, or a combination of both).

In some implementations, the monitoring device 108 can also include a timer (e.g., as a module of a microprocessor or microcontroller of the monitoring device 108). The timer can enable a user of the device 108 to monitor an amount of time elapsed since the chest compression treatment commenced. The initiation of time recording can be triggered by a user interacting with the device 108, by identifying start of chest compression based on the received chest compression waveform or detecting chest displacement, by detecting the deployment of a defibrillator, etc. For example, a compression displacement, which is proportional to the compression force applied by the rescuer on the patient's chest, that is different than 0 cm can be used as an indicator that chest compression treatment was initiated.

The monitoring device 108 can also include a rate indicating prompt (e.g. a metronome) and/or audible, visual or text instructional prompts to perform chest compressions at a given compression rate or with a particular timing. For example, the user can be initially prompted with the use of a metronome (e.g., a rate indicating prompt) and/or audible instructional prompts to perform chest compressions at a specific rate (e.g., starting according to clinical guidelines, such as 100 cpm with 4-5 cm compression depths and continuing with compression rates updated based on the cardiovascular response of the patient 102). Audible prompts may take the form of verbal messages such as, "Press Faster" or a particular tone that indicates that the correct rate or timing has been achieved, for instance a "Ping" sound for when the correct rate or timing has been achieved and a "Thud" sound for when the rate is incorrect. An example of a text prompt might be "Press Faster" or "Press slower" appearing on a display of a defibrillator that provides chest compression coaching. An example of a visual prompt might be a numeric value of the compression rate; it might also be an up or down arrow indicating for the rescuer to press faster or slower, respectively.

The compression rate and/or compression depth can be altered from the recommended guideline via the metronome and voice prompts to improve circulation based on the determined chest compression efficiency. For example, the feedback control system via the metronome and audible prompts can assist the user in manually changing the compression rate or authorizing an automatic change of the compression rate, as described with reference to FIG. 5. In implementations where chest compressions are delivered by a mechanical device, such as a belt driven or piston based chest compression device, the compression rate may be modified based on a physiologic parameter indicative of the blood flow or pressure waveform, based on elapsed time, or a combination of both.

In some implementations, the user can be prompted by the monitoring device 108 to perform chest compression at a particular compression rate. The user may be provided additional prompts, for example, relating to the compression depth (e.g., to push harder or softer), to fully release the chest, etc. For example, if the monitoring device 108 has determined that the chest is not being compressed to the clinically recommended depth of 4-5 cm or not being completely released at the end of each compression the device may prompt the user to correct his or her chest compression depth and/or release.

The monitoring device 108 can also have audio capability. For example, based upon detection of a particular chest compression condition, the monitoring device 108 can issue audible prompts instructing the rescuer to decrease compression rate, to stop compressions for a brief period or to deliver one or several rescue breaths. The monitoring device 108 can prompt the rescuer to resume chest compressions at an updated compression rate as it monitors compression rate and physiologic parameters indicative of blood flow or pressure (e.g., vascular response, blood flow, etc.) to estimate the success of chest compression efforts and the device may provide further prompts related to compression rate, depth, and breathing. In another example, the monitoring device may prompt the rescuer to provide the clinically recommended compression rate at the beginning of chest compression treatment and gradually decrease the rate of chest compressions as a function of lapsed time. For example, the rescuer may be prompted to decrease the compression rate to from about 100 compressions per minute (cpm) to about 75 cpm. As chest compression treatment progresses the rescuer may be prompted to decrease compression rates further based on the monitored physiologic parameter(s), for example, to about 50 cpm.

Figure 2A:
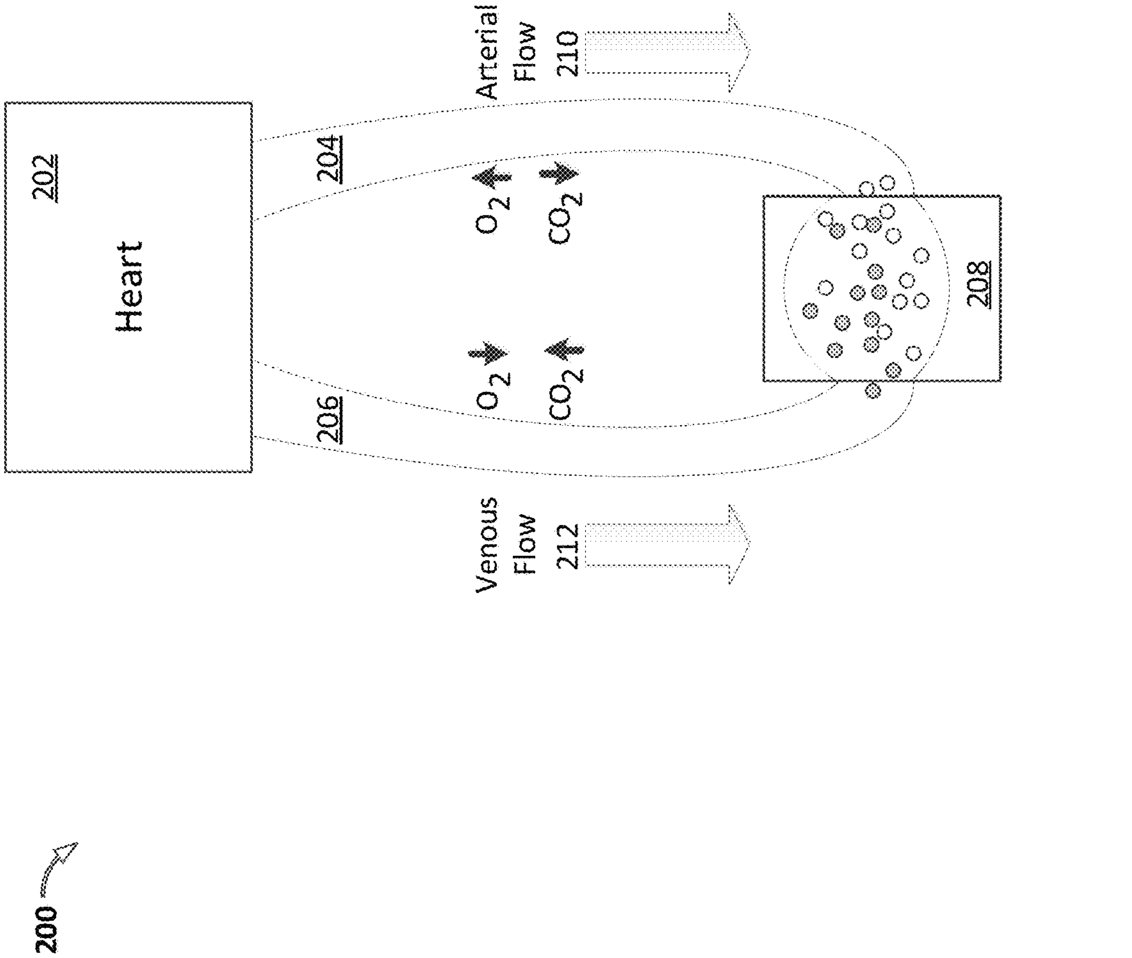
FIG. 2A is an example diagram of the cardiovascular system during a chest compression treatment.

FIG. 2A shows an example diagram of blood flow through a model of a cardiovascular system 200 during chest compression treatment. The cardiovascular system 200 includes a heart 202, an arterial segment 204, a venous segment 206, and a peripheral segment 208. In the example diagram 200 the heart 202 of a patient is analogized to a black box. During normal (healthy) sinus rhythm, the arterial segment 204 of the cardiovascular system 200 acts as a buffer that regulates blood flow 210, resulting in relatively steady flow of mostly oxygenated blood towards the peripheral segment 208 (e.g., tissue beds). During normal sinus rhythm, the venous segment 206 of the cardiovascular system 200 transports the deoxygenated blood 212 from the peripheral segment 208 back to the heart 202. During cardiac arrest, the concentration of oxygenated blood can be higher in the arterial segment 204 than in the venous segment 206 and the concentration of deoxygenated blood can be higher in the venous segment 206 than in the arterial segment 204.

During cardiac arrest, the blood flow 210 through the arterial segment 204 and the blood flow 212 though the venous segment 206 changes and can be associated with the applied chest compressions. During a chest compression treatment, a chest compression that is applied to the heart 202 induces blood flow 210, 212 in both arterial segment 204 and venous segment 206 (e.g., descending aorta and inferior vena cava), respectively. For example, chest compressions generate forward blood flow from the heart 202 towards the peripheral segment 208 through both the arterial segment 204 and the venous segment 206. Chest decompresssions are associated with periods of backward blood flow from the peripheral segment 208 to the heart 202 through both the arterial segment 204 and the venous segment 206. Chest compression generated blood flow 210, 212 can travel with a particular delay through the arterial segment 204 and the venous segment 206.

Figure 2B:
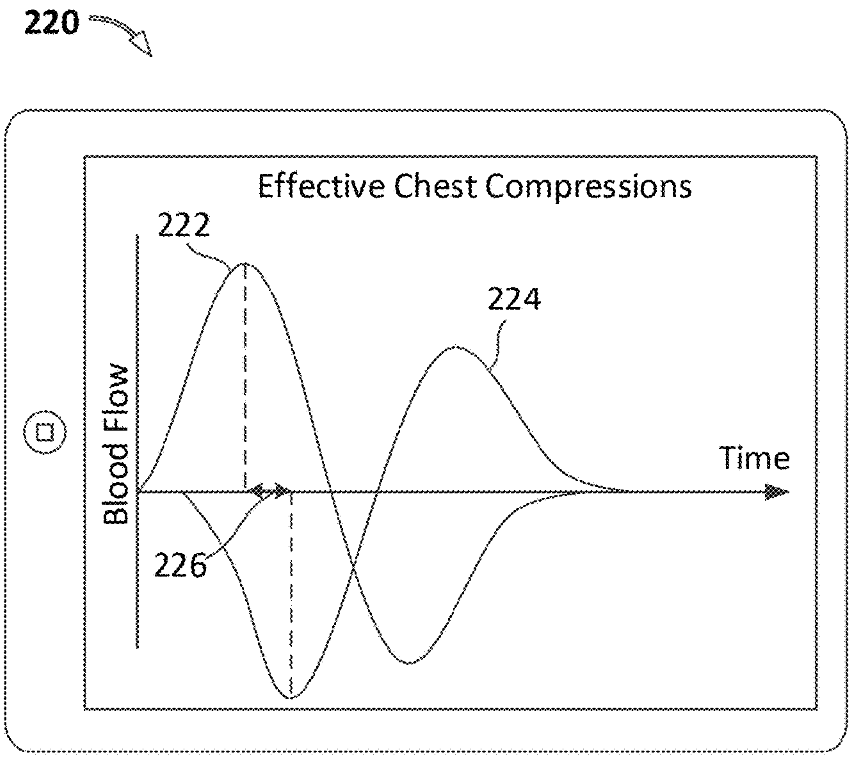
FIGS. 2B and 2C illustrate examples of signals illustrating arterial and venous blood flows comparing chest compression effectiveness.
Figure 2C:
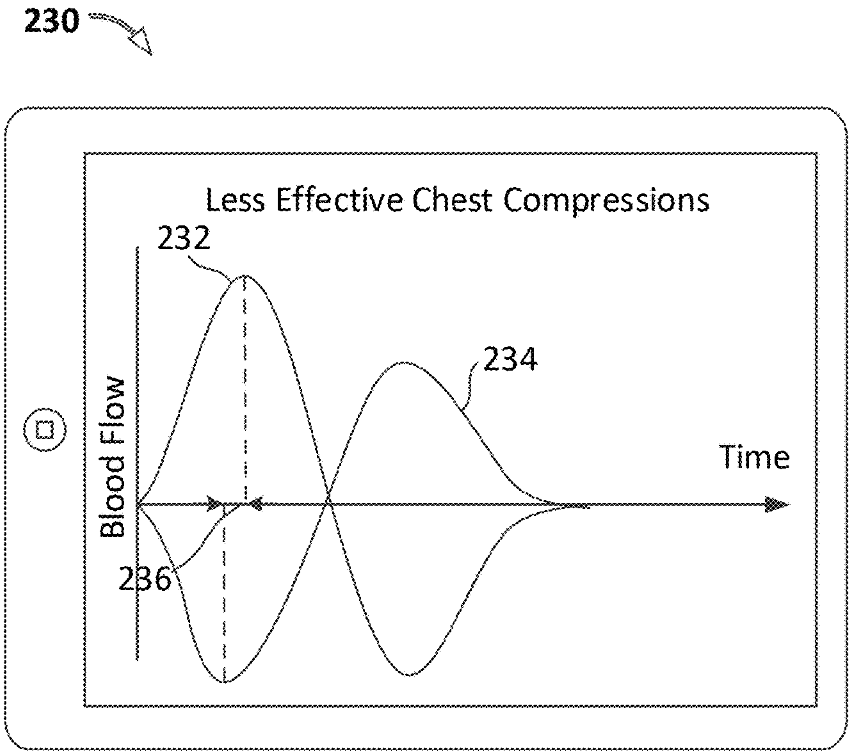
Figure 2D:
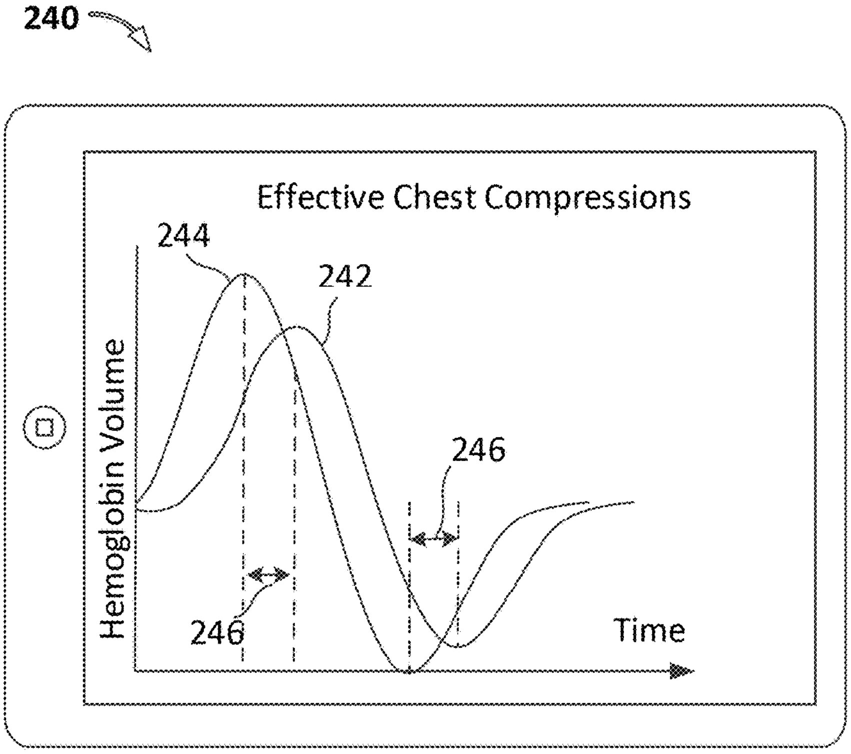
FIGS. 2D and 2E illustrate examples of signals illustrating arterial and venous blood volume comparing chest compression effectiveness.
Figure 2E:
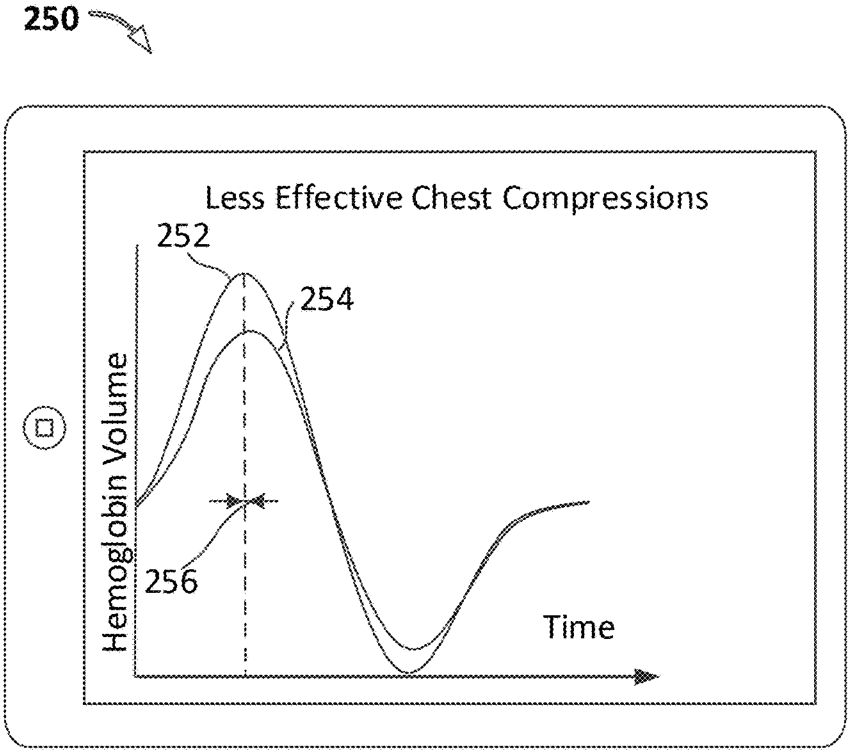

The delay between the blood flow 210 in the arterial segment 204 (e.g., descending aorta) and the blood flow 212 in its corresponding venous segment 206 (e.g., inferior vena cava) can indicate the efficiency of the chest compression treatment, as illustrated in FIGS. 2B-2D and 4C-4F. The delay between the blood flow 210 in the arterial segment 204 (e.g., descending aorta) and the blood flow 212 in its corresponding venous segment 206 (e.g., inferior vena cava) can affect the volume of oxygenated and deoxygenated blood in the peripheral tissue 208, as illustrated in FIGS. 2D, 2E, and 4G-4I. For example, during effective chest compressions, the blood flow 210 through the arterial segment 204 is ahead of the blood flow 212 through the venous segment 206 (FIGS. 2B, 4C and 4D), such that more oxygenated blood reaches the peripheral tissue 208 before the deoxygenated blood (FIGS. 2D and 4G). During less effective chest compressions, the blood flow 212 through the venous segment 206 is ahead of the blood flow 210 through the arterial segment 204 (FIGS. 2C, 4E and 4F), such that more deoxygenated blood reaches the peripheral tissue 208 before the oxygenated blood (FIG. 4H). When chest compressions stop generating net forward blood flow the arterial and venous inverted flow peaks are substantially simultaneous and the oxygenated and deoxygenated blood arrive at the tissue beds at substantially the same time (FIG. 2E).

FIGS. 2B and 2C illustrate examples of blood flow distribution 220, 230 that could be measured by a tonometer, a laser Doppler blood flow sensor, an ultrasound Doppler blood flow sensor, and/or other sensor for measuring a blood flow or an equivalent metric during effective and less effective chest compressions, respectively. A blood flow sensor can be configured to monitor arterial blood flow 222 in a particular arterial segment 204 (e.g., carotid artery, renal artery, brachial artery, femoral artery, and/or abdominal aorta). The same or a different blood flow sensor can be configured to monitor venous blood flow 224 in a corresponding venous segment 206. The blood flow sensor(s) can be configured to detect the simultaneous variation of blood flow through a target arterial segment 204 and venous segment 206. The arterial and venous blood flows can be utilized to monitor changes in the cardiovascular system response during chest compression treatment to provide an indication of chest compression efficiency.

As illustrated in FIG. 2B, during effective chest compression treatment, the peaks of the arterial blood flow waveform 222 appear before the peaks of the inverted venous blood flow waveforms 224, such that a positive time delay 226 that is larger than zero is distinguishable between the arterial and venous peaks of the blood flow waveforms 222 and 224. The positive time delay between the arterial and venous peaks of the blood flow waveforms 222 and 224 indicates that arterial blood arrives at the peripheral tissue before the venous blood. If the arterial blood flow waveform 222 leads the venous blood flow waveform 224 (as illustrated in FIG. 2B) the circulatory system includes a net forward blood flow, which indicates that the chest compression treatment is effective (e.g., meets a threshold of effectiveness). As illustrated in FIG. 2C, if the chest compression treatment is less effective (e.g., does not meet a threshold of effectiveness) the peaks of the inverted venous blood flow waveform 234 appear before the peaks of the arterial blood flow waveforms 232, such that a negative time delay 236 is distinguishable between the arterial and venous peaks of the blood flow. During less effective chest compression treatment blood flow waveforms 232 and 234 indicate that the circulatory system is absent of net forward blood flow.

FIGS. 2D and 2E illustrate examples of blood volume distribution 240, 250 that could be measured by a photoplethysmographic system during effective and less effective chest compressions, respectively. A photoplethysmographic sensor can be configured to monitor oxygenated and deoxygenated blood (hemoglobin) volume in the peripheral segment 208 (e.g., tissue bed of an anatomical location such as a finger, toe, wrist, ear lobe, ear concha, forehead, amongst others) as a surrogate for the pressure drop across the tissue. In some examples, oxygenated blood (e.g., 98% oxygenated) may be transported to the imaged peripheral segment 208 by the arterial segment 204. In some examples, deoxygenated blood (e.g., 70% oxygenated) may be transported to the imaged peripheral segment 208 by the venous segment 206. The photoplethysmographic system can be configured to detect the variation of blood distribution through a target peripheral segment 208 based on the amount of light that is absorbed or reflected. The photoplethysmographic signal varies with changes in blood volume through the target tissue or blood vessels. Photoplethysmography can be utilized to monitor changes in (oxygenated and deoxygenated) blood volumes in the peripheral segment 208 during chest compression treatment to provide an indication of chest compression efficiency.

As illustrated in FIG. 2D, during effective chest compression treatment, the oxygenated blood volume waveform 242 and the deoxygenated blood volume waveform 244 (e.g., that can be measured using a photoplethysmographic system) are out of phase (a time delay 246 that is larger than zero is distinguishable between the peaks of the blood volume waveform 242 and 244). For example, out of phase blood volume waveforms 242, 244 can be indicated by positive flow of oxygenated blood that arrived at the peripheral tissue before the deoxygenated blood. If the blood volume waveforms 242 and 244 illustrated in FIG. 2D are out of phase (e.g., time delay 246 is larger than 0) the circulatory system includes a net forward blood flow, which indicates that the chest compression treatment is effective (e.g., meets a threshold of effectiveness). As illustrated in FIG. 2E, if the chest compression treatment is less effective (e.g., does not meet a threshold of effectiveness) the blood volume waveforms 252 and 254 are in phase (e.g., time delay 256 is approximately 0) and the circulatory system is absent of net forward blood flow.

Figures 3A, 3B, 3C:
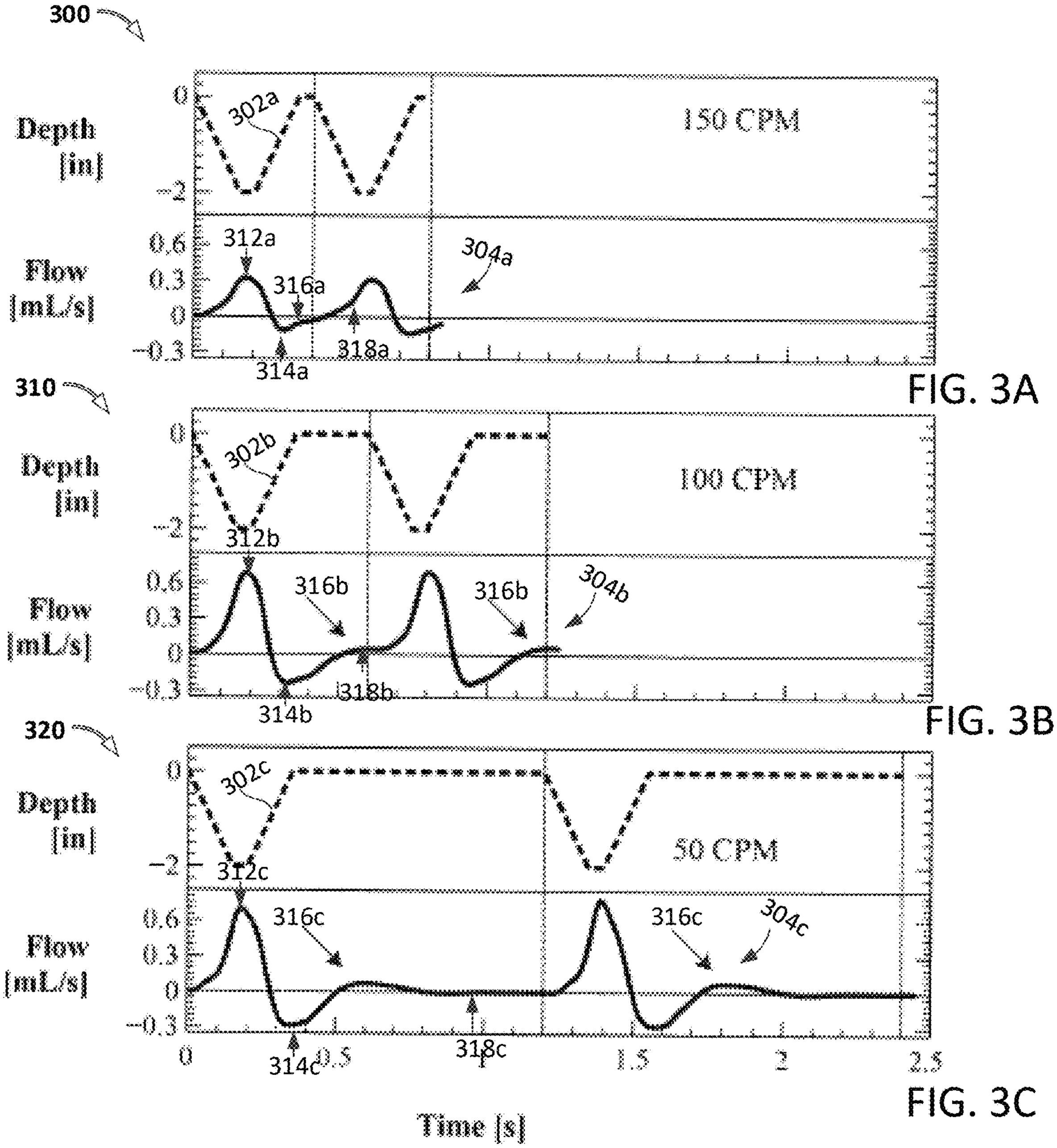
FIGS. 3A-3C are examples of blood flows corresponding to different chest compression treatments.

FIGS. 3A-3C are plots of blood flow volume (mL) waveforms 300, 310, 320 illustrating the impact of different chest compression rates on the cardiovascular response. A cardiovascular system during chest compression treatment can be characterized by a frequency of blood flow oscillation, or ringing frequency, which is about 100 Hz. For example, a rate of 100 compressions per minute can interfere with the second period of forward flow, and that a rate of 150 compression per minute is fast enough that it interferes with both the first and second oscillations (as illustrated in FIGS. 3A and 3B). The ringing frequency can vary between patients based on different physical parameters of the cardiovascular system 200 and cardiovascular parameters affected by patient's age (e.g., vascular elasticity, artherosclerotic degree, etc.), and it can also vary over time during a chest compression treatment (e.g., due to the pooling of blood on the venous side of the cardiovascular system). The change of the ringing frequency of the arterial segment during chest compression treatment requires changes to the chest compression rate to optimize blood flow. Forward flow per compression can be optimized by delivering the compressions at an optimized depth and at a rate that is below the ringing frequency of a particular patient. In some implementations, the compression depth can be adjusted to maximize the amplitude of the first oscillation. In some implementations, the patient monitoring device can generate an arbitrary compression recommendation (e.g., deeper or shallower compressions), monitor changes in cardiovascular response to validate improvement, or if missing, provide a different recommendation. The ringing frequency can be determined based on the blood pressure and the blood flow in arterial and venous segments of the cardiovascular system. For example, chest compressions can generate up to two blood flow oscillations (physiologically forward to physiologically backward) per chest compression. After initiation of the chest compression, the blood flow waveform corresponding to two oscillations is extracted. The ringing frequency is calculated as the inverse of the time between the peaks of the two extracted consecutive oscillations.

The plots illustrated in FIGS. 3A-3C were measured using a perivascular ultrasound Doppler blood flow measurement system in the upper circulatory system (e.g., carotid artery) of the body of porcine models of ventricular fibrillation administered chest compressions at 150, 100, and 50 cpm, respectively. Each of the displayed blood flow waveforms 304*a*, 304*b*, and 304*c* indicates the variation in blood flow corresponding to the applied compression rate 150, 100, and 50 cpm, respectively relative to compression depth waveforms 302*a*, 302*b*, and 302*c*, respectively. The blood flow waveforms 304*a*, 304*b*, and 304*c* include variations corresponding to the applied compression depth waveforms 302*a*, 302*b*, and 302*c*. For example, the variations of the blood flow 304*a*, 304*b*, and 304*c* include a peak region 312*a*, 312*b*, 312*c* corresponding to each compression, a backward flow minimum 314*a*, 314*b*, 314*c*, a local maximum 316*a*, 316*b*, 316*c* and a baseline region 318*a*, 318*b*, 318*c*. Those of skill in the art may refer to the peak region as a systolic-type behavior that occurs during chest compression; similarly, the region characterized by the local maximum and baseline may be referred to as a diastolic-type behavior.

Referring to FIGS. 3A-3C, each peak region 312*a*, 312*b*, 312*c*, backward flow minimum 314*a*, 314*b*, 314*c*, local maximum 316*a*, 316*b*, 316*c* and baseline region 318*a*, 318*b*, 318*c* can be distinguished in the blood flow waveforms 304*a*, 304*b*, and 304*c*, respectively. That is, each of the noted features is prominently shown in the waveform for identification. Referring to FIG. 3A, some of the above-noted features of the blood flow waveforms 304*a* are not easily distinguished from other portions of the waveform. For example, the local maxima 316*a* and the baseline regions 318*a* cannot be identified in the blood flow waveforms 304*a*. It has been observed that for some cases, the magnitude of the peak region 312*a*, 312*b*, 312*c* and the amplitude of the backward flow minimum 314*a*, 314*b*, 314*c* is inversely proportional with the compression rate. As illustrated in FIG. 3C, at times, the peak region 312*c* and the backward flow minimum 314*c* may present larger magnitudes in the mean blood flow waveforms 304*c* corresponding to the lower compression rate of 50 cpm.

As illustrated in FIG. 3B, the blood flow waveform 304*b* corresponding to a compression rate of 100 cpm appears to provide more favorable flow characteristics. For example, with each compression, the peak region 312*b* is accompanied by a local maximum 316*b* indicating that additional blood is able to flow, possibly due to the occurrence backflow reflections in a positive direction. It is noted that the blood flow waveform 304*a* corresponding to a compression rate of 50 cpm also includes a prominent local maximum 316*a*, however, the baseline region 318*a* covers a substantially long time period before the next compression ensues. With the objective being to maximize blood flows, it is preferable for a compression to begin immediately after or during the local maximum 316*b* (as shown by blood flow waveform 304*b*), rather having a relatively long delay (as indicated by the extended baseline region 318*a* of the blood flow waveform 304*a*) before a subsequent compression begins. As discussed above, the blood flow waveform 304*a* corresponding to compression rate of 150 cpm shows respective peak regions 312*a* yet a local maximum 316*a* is not distinguishable. Depending on the amount of blood flow per compression, it may be preferable for the compressions to be timed such that the local maximum 316*a*, 316*b*, 316*c* appears (as illustrated in FIGS. 3B and 3C) so as to increase overall physiologically forward blood flow.

It should be appreciated that the features present in the blood flow waveforms corresponding to particular compression rates can vary depending on the amount of time elapsed from when continuous compressions have been initiated. For instance, as compressions continue, for a given compression rate, the characteristics of the blood flow waveform, such as the length of the baseline region 318*a*, 318*b*, 318*c*, magnitude of the peak region 312*a*, 312*b*, 312*c*, magnitude of the backward flow minimum 314*a*, 314*b*, 314*c*, magnitude of the local maximum 316*a*, 316*b*, 316*c*, etc., may change. The recommended compression rate, provided through feedback systems described herein, may be based, at least in part, on particular features of the blood flow waveforms, elapsed time period, and/or other indications of arterial and venous blood flow.

Figure 4A:
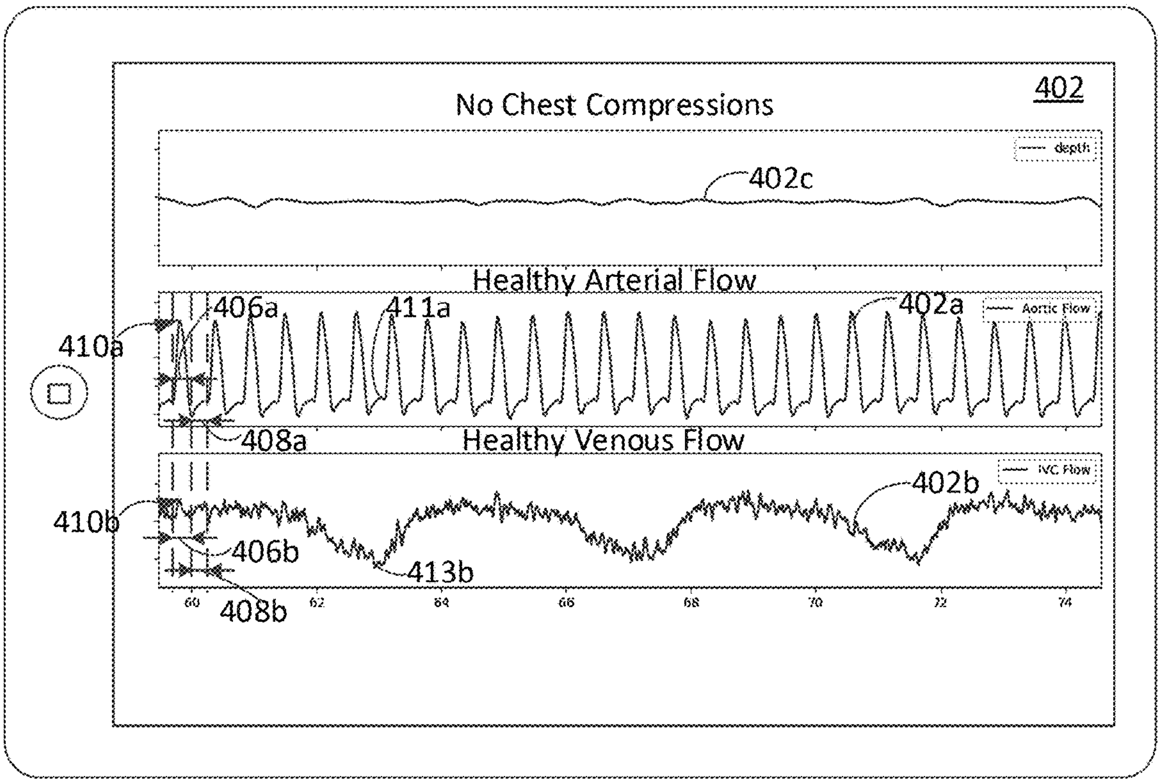
FIGS. 4A and 4B are plots of healthy arterial and venous blood flow waveforms.
Figure 4B:
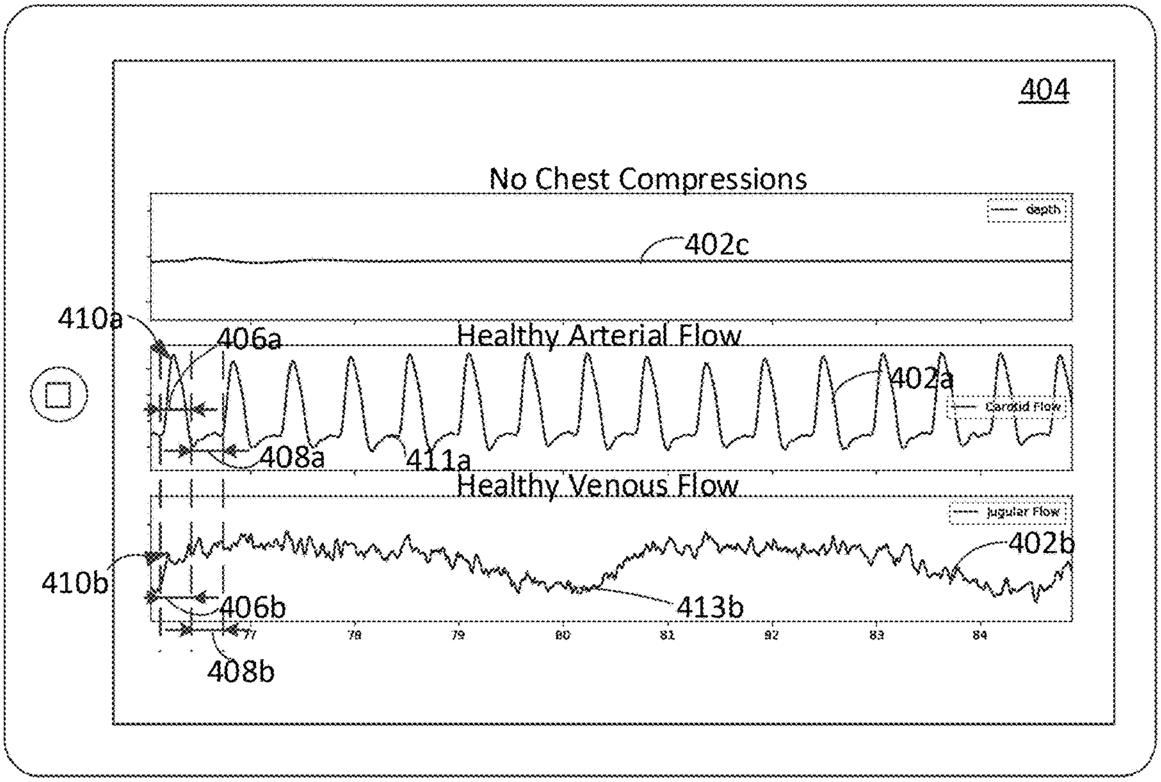

FIGS. 4A and 4B are plots 402, 404 of healthy arterial and venous blood flow waveforms. A healthy cardiovascular system is effective in transporting and regulating the blood flow to maintain a constant blood flow despite changes in perfusion pressure. In particular, the left ventricle pumps the blood via the aortic valve into the aorta, which branches into the ascending aorta (FIG. 4B) for delivery throughout the upper body heads and arms, and the descending aorta (FIG. 4A) for delivery throughout the lower body including the trunk and legs via the network of arteries, capillaries, and finally returned to the heart via the venous system (superior vena cava and the inferior vena cava, which both merge into the center venous). The right atria and the left atria are synchronized to pump simultaneously. The right ventricle and the left ventricle are also synchronized to pump simultaneously. In every pumping cycle, each chamber undergoes an expansion cycle called diastole followed by a contraction cycle called systole.

The arterial blood flow 402*a* is mainly generated by the cardiac output and is strongly correlated to cardiac contractions. For example, FIG. 4A illustrates arterial blood flow waveform 402*a* in a healthy descending aorta and FIG. 4B illustrates arterial blood flow waveform 402*a* in a healthy common carotid artery, both presenting a periodic patter matching the cardiac activity. As illustrated in FIGS. 4A and 4B, arterial blood flow waveform 402*a* includes two main components: a forward moving wave 406*a* and a reflected wave 408*a*. The forward wave 406*a* is generated when the heart (ventricles) contracts during systole. The forward wave 406*a* includes a systolic peak 410*a* corresponding to the maximum ejection flow. The forward wave 406*a* travels from the heart through the aorta and gets reflected at the bifurcation of the aorta into two iliac vessels. In a healthy cardiovascular system, the reflected wave 408*a* usually returns in the diastolic phase, after the closure of the aorta valves. The returned wave 408*a* includes a notch (local peak) 411*a*. The returned wave 408*a* also helps in the perfusion of the heart through the coronary vessels as it pushes the blood through the coronaries.

As a difference to the arterial blood flow waveform 402*a*, the venous blood flow waveform does not present a strong correlation with the cardiac output and are not dependent or induced by the heart contraction. Instead, the oscillations present in venous flow in FIGS. 4A and 4B are mostly related to ventilation 413*b*, throughout all venous segments, in which the venous blood flow waveform can be measured. The venous blood flow waveforms in a healthy cardiovascular system correspond to potential driven flow as previously described, and the blood flow in the veins is approximately constant (after filtering out the low frequency 413*b* corresponding to ventilations). For example, FIG. 4A illustrates venous blood flow waveform 402*b* in a healthy inferior vena cava and FIG. 4B illustrates venous blood flow waveform 402*b* in a healthy jugular vein. As shown in FIGS. 4A and 4B, the systolic and diastolic phases 406*b*, 408*b* of the venous blood flow waveform 402*b* are not clearly distinct from each other as the systolic and diastolic phases 406*a*, 408*a* of the arterial blood flow waveform 402*a*. If temporal markers segmenting the systolic and diastolic phases 406*a*, 408*a* are extracted from the arterial blood flow waveform 402*a* and applied to the venous blood flow waveform 402*b* it appears that the diastolic features during the diastolic phase 408*b* of the venous blood flow waveform 402*b* are generally less evident or distinguishable than the systolic features 410*b* that can include a local maxima during the systolic phase 410*b*.

Figure 4C:
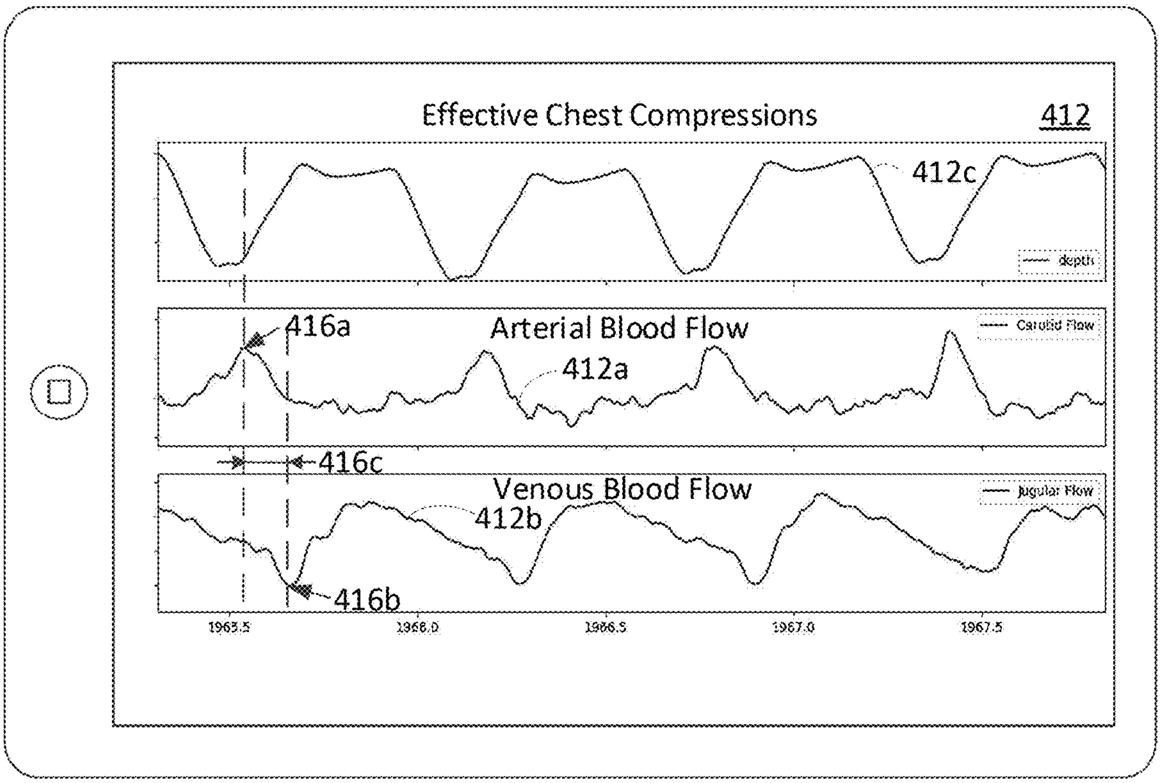
FIGS. 4C and 4D are plots of arterial and venous blood flow waveforms corresponding to effective chest compressions.
Figure 4D:
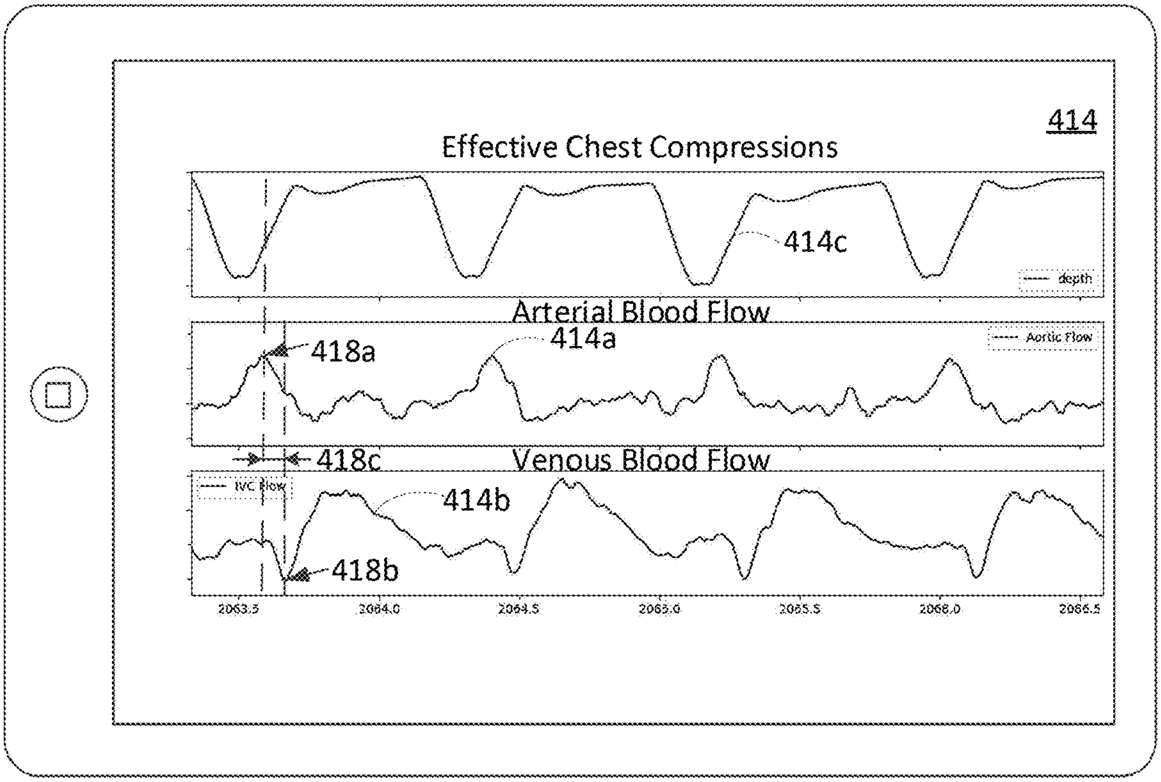

FIGS. 4C and 4D are examples of plots 412, 414 of modeled arterial and venous blood flow waveforms corresponding to effective chest compressions 404*c*. FIGS. 4C and 4D can be used to estimate the degree of effectiveness of chest compressions based on measures of arterial blood flow as compared with measures of venous blood flow resulting from the chest compressions in both upper and lower circulatory system. FIG. 4C illustrates examples of modeled cerebral arterial blood flow waveform 412*a* in a common carotid artery and modeled venous blood flow waveform 412*b* in a jugular vein during effective (efficient) chest compressions characterized by a periodic chest compression waveform 412*c*. The modeled arterial blood flow waveform 412*a* and the modeled venous blood flow waveform 412*b* present periodic variations of blood flow induced during cardiac arrest by the application of chest compressions. The modeled arterial blood flow waveform 412*a* includes multiple peaks, with the most prominent peak per compression cycle appearing within a short interval (e.g., approximately 1-20 ms) after the initiation of the chest compression. As a difference to the venous blood flow waveform corresponding to a normal cardiac function that mainly reflects ventilations (as illustrated in FIGS. 4A and 4B), the modeled venous blood flow waveform 412*b* presents a periodic pattern corresponding to and induced by the chest compressions 412*c*, such that the frequency of the modeled venous blood flow waveform 412*b* matches the frequency of the chest compressions 412*c*. The modeled venous blood flow waveform 412*b* includes multiple negative inverted peaks (shown as negative due to the nature of the flow vector being in the reverse direction from natural anatomical flow), with the most prominent peak per compression cycle appearing within a particular time interval (e.g., approximately 10-40 ms) after the initiation of the chest compression. In some implementations, the peaks of the blood flows (e.g., global maxima of the arterial blood flow and the global minima of the inverted negative venous blood flow per compression cycle) can be automatically determined within predetermined intervals. The predetermined intervals can be correlated with the chest compression waveform (e.g., onset of chest compressions can be used as a reference point for detection intervals) to eliminate peak detection errors (e.g., local maxima or minima). As shown in FIG. 4C, the positive arterial blood flow peaks 416*a* (maxima corresponding to a particular chest compression) appear to be temporally displaced from and before the negative inverted venous blood flow peaks 416*b*, indicating that the chest compression was effective. For example, a time delay 416*c* can be distinguishable between the positive arterial blood flow peaks and the negative inverted venous blood flow peaks. The time delay 416*c* with the arterial peak appearing earlier than the negative inverted venous blood flow peak indicate that oxygenated blood is ahead of the deoxygenated blood, corresponding to chest compression effectiveness.

FIG. 4D illustrates examples of modeled peripheral blood flow 414. For example, the modeled peripheral blood flow can correspond to arterial blood flow waveform 414*a* in a descending aorta and venous blood flow waveform 414*b* in an inferior vena cava during effective (efficient) chest compressions 404*c*. The modeled peripheral arterial blood flow waveform 414*a* and the modeled venous blood flow waveform 414*b* present periodic variations of blood flow induced during cardiac arrest by the application of chest compressions. The modeled arterial blood flow waveform 414*a* includes multiple peaks, with the most prominent peak per compression cycle appearing within a short interval (e.g., approximately 1-20 ms) after the initiation of the chest compression, and before the corresponding negative inverted peak. The modeled peripheral venous blood flow waveform 414*b* includes multiple negative inverted peaks, with the most prominent peak per compression cycle appearing within a particular time interval (e.g., approximately 10-40 ms) after the initiation of the chest compression. The positive peripheral arterial blood flow peaks (maxima corresponding to a particular chest compression) 418*a* can appear to be temporally displaced from and before the negative inverted peripheral venous blood flow peaks 418*b* (minima of the respective chest compression). For example, a time delay 418*c* can be distinguishable between the positive peripheral arterial blood flow peaks and the negative inverted peripheral venous blood flow peaks, with the peripheral arterial peak appearing earlier than the negative inverted venous blood flow peak indicating chest compression efficiency. The time delay 418*c* between the peripheral blood flow peaks can be different from the time delay 416*c* between the cerebral blood flow peaks. The difference between the time delays can indicate that an effective chest compression can affect each segment of the cardiovascular system in a unique way.

Figure 4E:
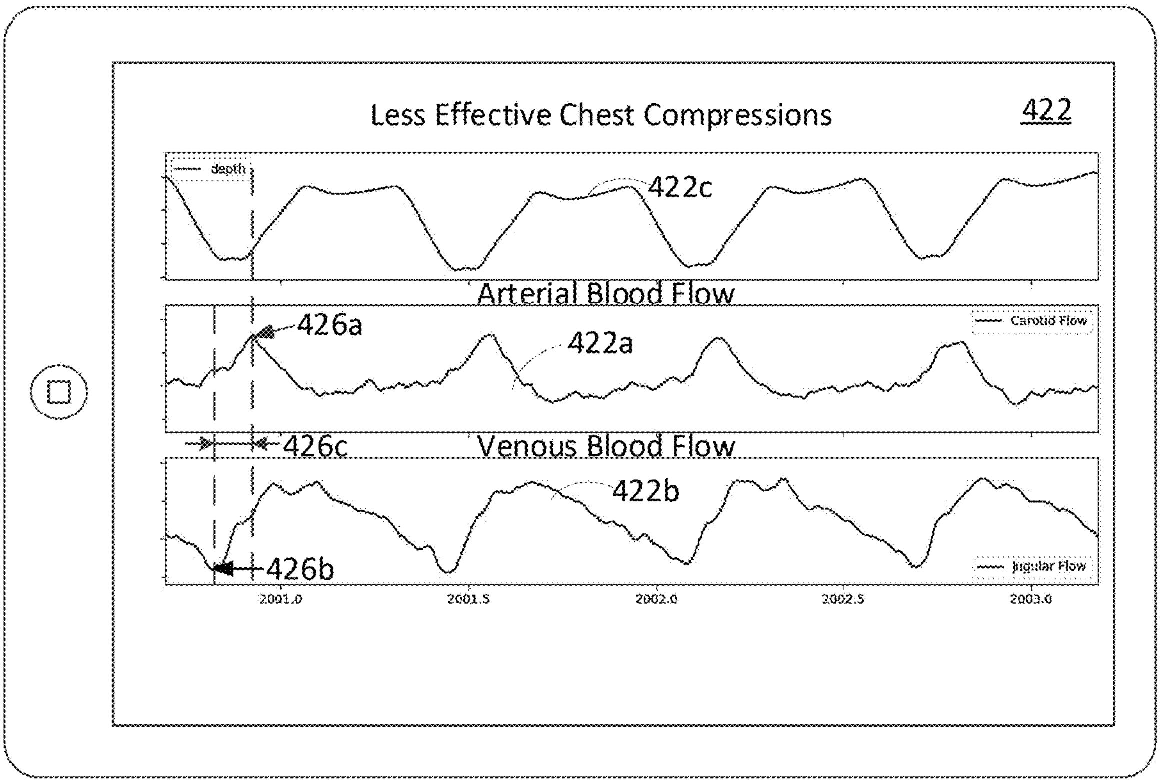
FIGS. 4E and 4F are plots of arterial and venous blood flow waveforms corresponding to less effective chest compressions.
Figure 4F:
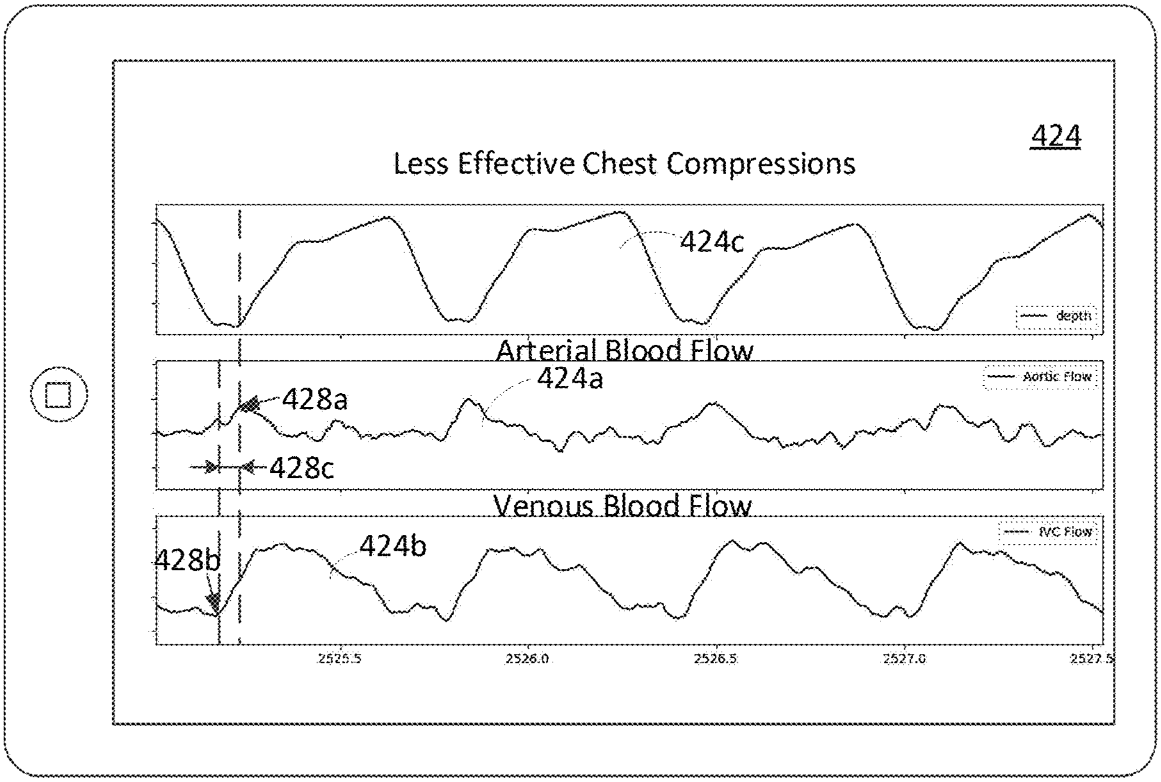
Figure 4G:
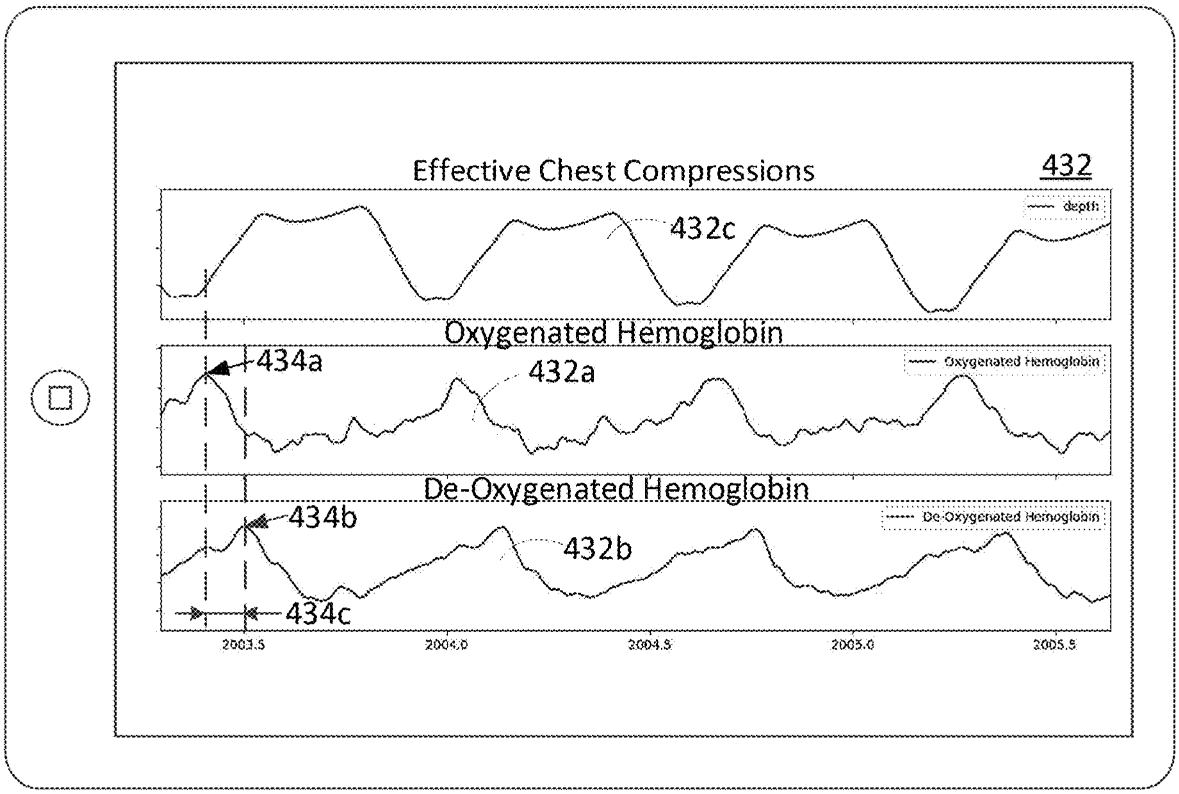
FIGS. 4G and 4H are plots of peripheral hemoglobin volume waveforms corresponding to effective chest compressions and less effective chest compressions, respectively.
Figure 4H:
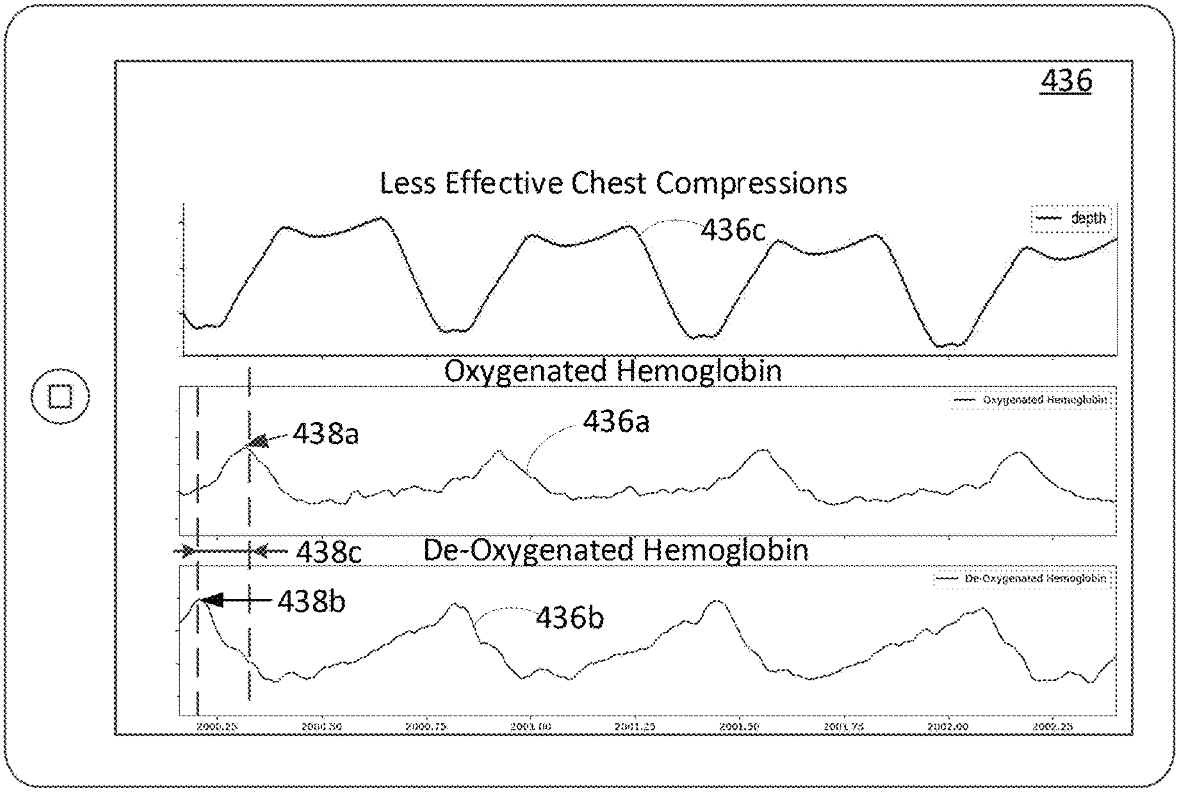

FIGS. 4E and 4F are plots 422, 424 of modeled arterial and venous blood flow waveforms corresponding to less effective chest compressions. FIG. 4E illustrates an example of modeled cerebral blood flow waveform 422. The modeled cerebral blood flow waveform 422 can correspond to arterial blood flow waveform 422*a* in a common carotid artery and a venous blood flow waveform 422*b* of a jugular vein during less effective (inefficient) chest compressions characterized by a periodic chest compression waveform 422*c*. The modeled arterial blood flow waveform 422*a* and the modeled venous blood flow waveform 422*b* present periodic variations of blood flow induced during cardiac arrest by the application of chest compressions. The modeled arterial blood flow waveform 422*a* includes multiple peaks, with the most prominent peak per compression cycle appearing within an interval (e.g., approximately 1-20 ms) after the initiation of the chest compression. The modeled venous blood flow waveform 422*b* includes multiple negative inverted peaks, with the most prominent peak per compression cycle appearing within a particular time interval (e.g., approximately 1-40 ms) around the initiation of the chest compression. The negative inverted venous blood flow peaks 426*b* can appear substantially simultaneous with or earlier than the positive arterial blood flow peaks 426*a*. For example, a time delay 426*c* can be distinguishable between the positive arterial blood flow peaks and the negative inverted venous blood flow peaks. The time delay 426*c* with the negative inverted venous peak appearing earlier than the positive arterial blood flow peak can indicate that deoxygenated blood is ahead of the oxygenated blood, corresponding to chest compression inefficiency.

FIG. 4F illustrates examples of modeled peripheral blood flow 424 for less effective (efficient) chest compressions. The modeled peripheral blood flow can correspond to arterial blood flow waveform 424*a* in a descending aorta and venous blood flow waveform 424*b* in an inferior vena cava during less effective (inefficient) chest compressions 404*c*. The modeled peripheral arterial blood flow waveform 424*a* and the modeled venous blood flow waveform 424*b* present periodic variations of blood flow induced during cardiac arrest by the application of chest compressions. The modeled arterial blood flow waveform 424*a* includes multiple peaks, with the most prominent peak per compression cycle appearing within a short interval (e.g., approximately 1-20 ms) after the initiation of the chest compression. The modeled peripheral venous blood flow waveform 424*b* includes multiple negative inverted peaks, with the most prominent peak per compression cycle appearing within a particular time interval (e.g., approximately 1-40 ms) around the initiation of the chest compression. The positive peripheral arterial blood flow peaks 428*a* can appear to be temporally displaced from the negative inverted peripheral venous blood flow peaks 428*b*. For example, a time delay 428*c* can be distinguishable between the positive peripheral arterial blood flow peaks and the negative inverted peripheral venous blood flow peaks, with the peripheral arterial peak appearing substantially simultaneous with or after the negative inverted venous blood flow peak indicating reduced chest compression efficiency, indicating less effective compressions. The time delay 428*c* between the peripheral blood flow peaks can be different from the time delay 426*c* between the cerebral blood flow peaks. The difference between the time delays can indicate that reduced effectiveness of chest compressions can affect each segment of the cardiovascular system in a unique way.

Even though FIGS. 4C-4F illustrate blood flow waveforms 412, 414, 422, 424 with detectable time delays between the positive arterial peak and the negative inverted venous peak, in some cases, the blood flow waveforms during chest compressions can have substantially temporally overlapping (e.g., negligible time delay between) peaks. The arterial and venous blood flow volume (mL) waveforms that appear to be substantially in phase present substantially similar onset of forward flow (a time delay is not clearly distinguishable between the increasing and decreasing segments of the blood flow volume (mL) waveforms at similar times relative to the chest compression waveforms). The arterial and venous blood flow waveforms that appear to be substantially in phase indicate that the positive rise in intrathoracic pressure generated by the chest compressions causes oxygenated blood to flow away from the heart through arteries substantially simultaneously with deoxygenated blood flowing away from the heart though the veins. The arterial and venous blood flow waveforms that appear to be substantially in phase (increasing and decreasing at similar times during the chest compression) indicate that chest compressions result in oxygenated and deoxygenated blood flowing towards peripheral tissue substantially simultaneous, which is very different from a healthy physiologic state. In phase arterial to venous blood flow waveforms are indicative of a less effective chest compression treatment. The analysis of arterial to venous blood flow waveforms to estimate the degree of effectiveness of chest compressions may be useful for a rescuer applying chest compressions to a patient experiencing cardiac arrest in providing feedback for modifying or maintaining the manner, in which chest compressions are applied, to induce a more effective forward blood movement.

FIGS. 4G and 4H show examples of plots 432, 436 of modeled oxygenated and deoxygenated hemoglobin concentration waveforms corresponding to effective and less effective chest compressions, respectively. The modeled oxygenated hemoglobin concentration waveforms 432*a*, 436*a* and the modeled de-oxygenated hemoglobin concentration waveforms 432*b*, 436*b* present periodic variations induced during cardiac arrest by the application of chest compressions. The modeled oxygenated hemoglobin concentration waveform 432*a*, 436*a* includes multiple peaks, with the most prominent peak per compression cycle appearing within a short interval (e.g., approximately 1-20 ms) after the initiation of the chest compression. As shown in FIG. 4G, corresponding to effective chest compressions 432*c*, the schematic of an oxygenated hemoglobin concentration waveform 432*a* includes a positive peak 434*a* corresponding to an applied chest compression, and the schematic of a de-oxygenated hemoglobin concentration waveform 432*b* includes a positive peak 434*b* also corresponding to the same applied chest compression, appearing within a particular time interval (e.g., approximately 10-60 ms) from the positive peak 434*a*. As illustrated in FIG. 4H, corresponding to less effective chest compressions 436*c*, the schematic of an oxygenated hemoglobin concentration waveform 436*a* includes a positive peak 438*a* corresponding to an applied chest compression, and the schematic of a de-oxygenated hemoglobin concentration waveform 436*b* includes positive peak 438*b* also corresponding to the same applied chest compression, appearing within a particular time interval (e.g., approximately 1-30 ms) before the positive peak 438*a*. As shown, the positive oxygenated hemoglobin peaks (maxima corresponding to a particular chest compression) 434*a*, 438*a* appear to be temporally displaced from the respective positive deoxygenated hemoglobin peaks 434*b*, 438*b* (minima of the respective chest compression); except the oxygenated hemoglobin peak 434*a* appears before the respective deoxygenated hemoglobin peak 434*b* for effective chest compressions, and the oxygenated hemoglobin peak 434*a* appears after the respective de-oxygenated hemoglobin peak 434*b* for less effective chest compressions. The time delay 434*c* between the oxygenated hemoglobin peaks 434*a* and the deoxygenated hemoglobin peaks 434*b* is larger than a threshold (e.g., approximately 20 ms) for effective chest compressions 432*c*. For example, the oxygenated hemoglobin peak 434*a* appears significantly earlier than the deoxygenated hemoglobin peak 434*b* indicating chest compression effectiveness. The time delay 438*c* between the oxygenated hemoglobin peaks 438*a* and the deoxygenated hemoglobin peaks 438*b* is smaller than a threshold (e.g., approximately 10 ms) and, as shown in FIG. 4H the deoxygenated hemoglobin peak 438*b* comes before the oxygenated hemoglobin peak 438*a*, for less effective chest compressions 432*c*. As an example, the peripheral arterial peak 438*a* can be detected substantially simultaneous with the deoxygenated hemoglobin volume peak 434*b* indicating decreased effectiveness of chest compressions. For both effective and less effective chest compressions, the time delay 434*c*, 438*c* between the oxygenated and deoxygenated waveforms peaks can be different from the time delays 416*c*, 418*c* or time delays 426*c*, 428*c* between the blood flow peaks detected in other segments of the cardiovascular system. The difference between the time delays can indicate the effectiveness of chest compression and the impact of chest compression on each segment of the cardiovascular system.

In various embodiments, it may be useful to provide an indication of the return of spontaneous circulation (ROSC) during the administration of chest compressions. For instance, systems and apparatuses employing one or more processors of the present disclosure may implement a ROSC detection algorithm that analyzes measured signals to determine whether ROSC has occurred or may have occurred during chest compressions.

As described herein, during the course of chest compressions, blood is forced into both arterial and venous segments of the vasculature. Accordingly, when arterial and venous blood flow is measured (e.g., using Doppler flow sensing or other methods as discussed herein), such as schematically shown in FIGS. 4C-4F, a chest compression will generate both a (positive) flow peak (e.g., peaks 416*a*, 418*a*, 426*a*, 428*a*) on the arterial side and a corresponding (inverted) flow peak (e.g., peaks 416*b*, 418*b*, 426*b*, 428*b*) on the venous side. Similarly, when oxygenated and de-oxygenated hemoglobin is measured (e.g., using photoplethysmography measurements or other methods as discussed herein), such as schematically shown in FIGS. 4G-4H, a chest compression will generate both an oxygenated hemoglobin peak (e.g., peaks 434*a*, 438*a*) and a corresponding de-oxygenated hemoglobin peak (e.g., peaks 434*b*, 438*b*).

However, it may be possible that ROSC may be detected during chest compressions. That is, while chest compressions are occurring, measured signals may provide an indication of restored cardiac activity, where the mechanism of blood flow occurs more naturally and substantially more so in a forward direction (e.g., at least partly due to appropriately timed cardiac valve opening and closures). As a result, during the occurrence of ROSC, flow and volume peaks associated with forward blood flow into the arterial side may be identified via analysis techniques described herein, yet correlated with an absence of corresponding peaks associated with blood flow into the venous side. For example, when arterial and venous blood flow is measured, the ROSC detection algorithm may analyze the associated flow signals to determine whether ROSC may have occurred by identifying (positive) flow peaks in the measured signals from the arterial side, yet correlating this feature with missing (inverted) flow peaks in the measured signals from the venous side. Similarly, when oxygenated and de-oxygenated hemoglobin is measured, the ROSC detection algorithm may analyze the associated volume signals to determine whether ROSC may have occurred by identifying oxygenated hemoglobin peaks in the measured signals, yet correlating this feature with missing de-oxygenated hemoglobin peaks in the measured signals.

Once such an indication of ROSC is detected, then the ROSC detection algorithm may output a signal for the system or apparatus to provide feedback or other appropriate feedback for a user that ROSC has been detected, or at least that ROSC may have occurred. As a result, the user may decide to pause compressions for a short time to determine whether continued compressions are necessary, given the occurrence of ROSC; alternatively, in the case where automated chest compressions are being provided, the user may elect to pause compressions as discussed above, or the automated compression device may itself pause compressions if ROSC is detected.

Figure 4I:
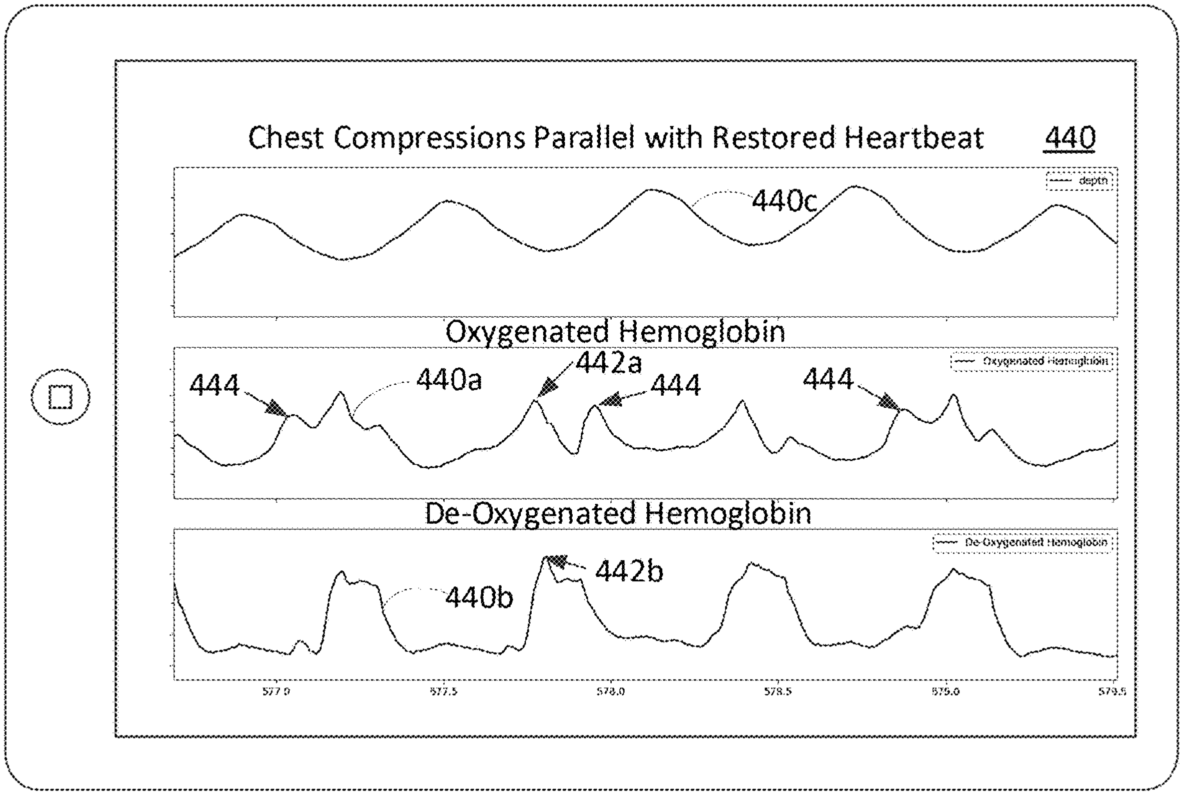
FIG. 4I is a plot of peripheral hemoglobin volume waveforms corresponding to chest compressions applied simultaneous to restored heartbeat.

FIG. 4I shows examples of plots 440 of modeled oxygenated and deoxygenated hemoglobin waveforms induced by chest compressions applied during restored cardiac activity. The schematic of the oxygenated hemoglobin waveform 440*a* includes multiple positive peaks including primary peaks 442*a* associated with the chest compression 440*c* and secondary peaks 444 associated with ROSC. As shown, a chest compression generates a primary peak 442*a* in the oxygenated hemoglobin signal and a corresponding primary peak 442*b* in the de-oxygenated hemoglobin signal The secondary peaks 444 in the oxygenated hemoglobin signal associated with the restored cardiac activity can be detected in the oxygenated hemoglobin waveform 440*a* (or arterial blood flow waveform) during chest compressions, yet for each of the secondary peaks 444 in the oxygenated hemoglobin signal, there is missing a corresponding peak in the de-oxygenated hemoglobin signal. Once an appropriate association is made during the course of chest compressions, where local (secondary) peaks in the oxygenated hemoglobin signal are identified and correlated by the absence of corresponding local (secondary) peaks in the de-oxygenated hemoglobin signal, then an output signal may be generated indicating that cardiac activity may have been restored. Similarly, when measuring blood flow, ROSC can be identified during the course of chest compressions. For example, local (secondary positive) peaks in the arterial blood flow signal can be correlated with intrinsic cardiac activity, while local (secondary inverted) peaks are absent from the venous blood flow signal, and an output signal may be generated indicating that cardiac activity may have been restored. The secondary peaks 444 associated with the restored cardiac activity can also appear in the oxygenated hemoglobin waveform (or arterial blood flow waveform) during the time intervals in which chest compressions are not applied (when primary peaks disappear). The primary positive oxygenated hemoglobin peaks (maxima corresponding to a particular chest compression) 442*a* can appear with a frequency that is equal or different from the frequency of the secondary peaks 444 associated with the restored cardiac activity. The primary positive oxygenated hemoglobin peaks (maxima corresponding to a particular chest compression) 442*a* can appear to be simultaneous or temporally displaced from the secondary peaks 444 associated with the restored cardiac activity. In some cases, the primary positive oxygenated hemoglobin peaks (maxima corresponding to a particular chest compression) 442*a* can appear to be simultaneous with the secondary peaks 444 associated the restored cardiac activity within one interval and temporally displaced from the secondary peaks 444 associated the restored cardiac activity within another interval. A time delay between the primary and the secondary oxygenated waveforms peaks can indicate that chest compressions can affect the cardiovascular system in a negative way by disrupting the regular blood flow or potentially inducing another cardiac event.

Figure 5:
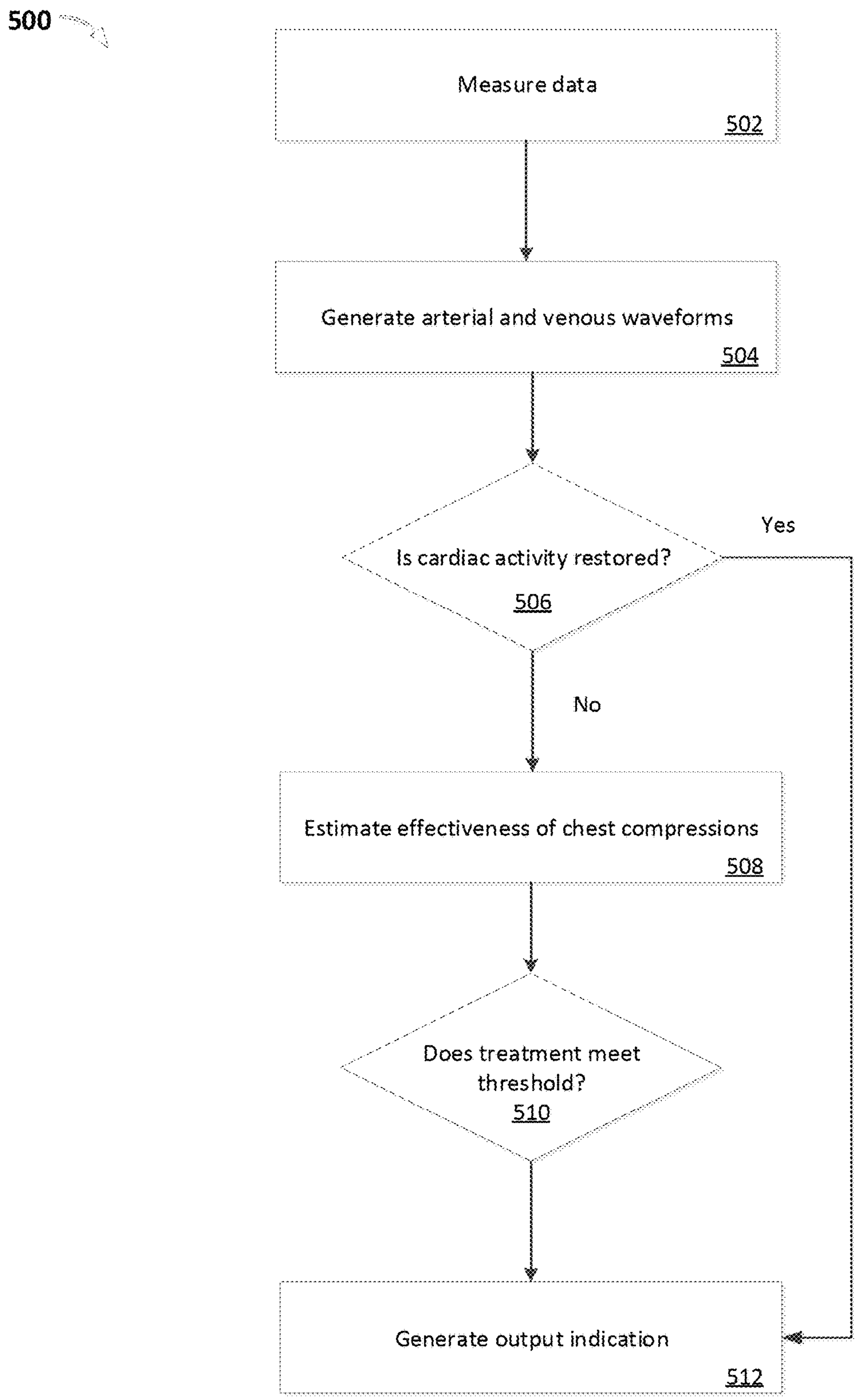
FIG. 5 is a flow chart of a process for managing a chest compression treatment.

FIG. 5 shows an example process 500 for assisting with chest compression treatment based on identification of a feature of the parameter(s) indicative of a blood flow or volume waveform of the patient. In some examples, the method 500 can be implemented by the patient monitoring device 108 described above with reference to FIGS. 1 and 2. However, other implementations are possible.

At step 502, data indicative of blood flow or blood volume in one or more vascular segments of a patient are measured by a sensor. For example, the recording can be received substantially in real-time from a photoplethysmography sensor, a laser Doppler blood flow sensor, an ultrasound Doppler blood flow sensor, a blood pressure sensor, or another sensor for measuring blood flow or pressure waveforms. The photoplethysmography sensor can be configured to identify oxygenated blood and deoxygenated blood. For example, the photoplethysmography sensor is configured to detect tissue response (e.g., absorption or reflectance) to interaction with an irradiation beam of a first color (e.g., first wavelength) for identifying oxygenated blood and a second color (e.g., second wavelength) for identifying deoxygenated blood, as described in further detail with reference to FIG. 1. For example, an indication can be provided for each absorbance measurement to correlate it to the wavelength (e.g., 750 nm, 810 nm, and 850 nm) of the emitted light beam that generated it. In parallel with the measurements of the photoplethysmography sensor or separate from measurements of the photoplethysmography sensor, data indicative of blood flow can be recorded noninvasively (e.g., on the surface of the patient's body) from a plurality of target vascular (arterial and venous) sites. The target tissue sites can include peripheral vasculature, inferior vena cava, carotid artery, renal artery, brachial artery, femoral artery, and/or abdominal aorta. In some implementations, it can be advantageous to simultaneously monitor blood flow in the upper circulatory system (e.g., common carotid artery and jugular vein) and blood flow in the lower circulatory system (e.g., abdominal aorta and descending vena cava). The upper circulatory system and the lower circulatory system can exhibit different responses to chest compressions. Simultaneous measurement can provide a more holistic view of blood flow, and improve accuracy of feedback to the rescuer or to the mechanical chest compressor.

In some implementations, information about the source of the blood flow data can be provided to a patient monitoring device. The patient monitoring device can adapt the configuration of the analysis tools based on the source of the blood flow data to enable optimal analysis. In some implementations, the blood flow data is received together with additional patient data, including the depth and rate of chest compressions exerted by the user on the patient, other physiological data recordings, medical history, physical exam findings, and other medical information that might be requested by a user. Patient data can be used in conjunction with patient-specific physiological parameters for data processing and display, or it can be used to correlate information extracted from the measured data indicative of the blood flow. In some cases, physiological parameters measured from sensors other than those used to determine the blood flow or volume waveform of the patient may be used to guide resuscitative therapy.

At step 504, data measured by the sensors is processed to generate arterial and venous blood flow and/or blood volume waveforms. For example, data measured by the photoplethysmography sensor includes data related to light absorption at different wavelengths that can be used to calculate changes in arterial, venous, and total hemoglobin concentration using an extended Beer-Lambert law. The data measured by the photoplethysmography sensor relates attenuation of light intensity to the optical path-length and optical properties of the target tissue considering scattering/diffusing effects of light within the target vascular segment. The pulse oximeter uses photoabsorption of oxygenated blood to determine arterial blood volume waveform, which is separately analyzed from deoxygenated blood to determine venous blood volume waveform.

Changes in blood volume can be determined from measurements of light absorbance by hemoglobin based on one or more methods including blind source separation signal processing methods and deterministic methods. The methods for determining blood volume based on light absorbance by hemoglobin consider that arterial blood and venous blood contain hemoglobin molecules that are saturated with oxygen and hemoglobin molecules that are not saturated with oxygen. As such a change in arterial blood volume can result in a change in absorbance of light at the three wavelengths described in this application. A change in venous blood volume has a similar effect.

Blind source separation signal processing methods to determine the change in arterial and venous blood volume from the measurements of light absorbance at different wavelengths can include principal component analysis, singular value decomposition, independent component analysis, dependent component analysis, non-negative matrix factorization, low-complexity coding and decoding, stationary subspace analysis, or common spatial pattern algorithms. Blind source separation methods can be effective at separating the sources (changes in arterial and venous blood volumes) from the mixed signals (changes in absorbance at different wavelengths) but blind source separation methods do not provide a differentiation between the sources (arterial source versus venous source). The results of blind source separation methods can be correlated with the oxygenated hemoglobin absorbance signal and the deoxygenated hemoglobin absorbance signal to differentiate between the arterial source and the venous source. Assuming that the arterial blood has a higher concentration of oxygenated hemoglobin than the venous blood, the source that better correlates with the oxygenated hemoglobin absorbance signal is the arterial waveform and the source that better correlates with the deoxygenated hemoglobin absorbance signal is determined as being the venous waveform.

The deterministic methods to determine the change in arterial and venous blood volume from the measurements of light absorbance at different wavelengths can be modeled using the following equations:

$$\Delta A_{oxy} \sim Sat_{Art} * \Delta Vol_{Art} + Sat_{Vein} * \Delta Vol_{Vein} \quad \text{(Eq 1)}$$

$$\Delta A_{deoxy} \sim (1 - Sat_{Art}) * \Delta Vol_{Art} + (1 - Sat_{Vein}) * \Delta Vol_{Vein} \quad \text{(Eq 2)}$$

$$\Delta A_{iso} \sim Vol_{Art} + \Delta Vol_{Vein} \quad \text{(Eq 3)}$$

In equations Eq1-Eq3, parameter A is the absorption of light, Sat is the oxygen saturation, Vol is the volume, the subscript oxy indicates oxygenated hemoglobin, the subscript deoxy indicates deoxygenated hemoglobin, the subscript iso indicates the sum of oxygenated and deoxygenated hemoglobin, the subscript Art indicates arterial properties and the subscript Vein indicates venous properties.

The deterministic method includes a loop between two steps. In the first step, oscillations in the absorbance of oxygenated hemoglobin and de-oxygenated hemoglobin are compared to the oscillations in the absorbance at the isosbestic point of hemoglobin to identify oscillations in the absorbance signals that are due to changes in arterial blood volume and oscillations in the absorbance signals that are due to changes in venous blood volume. After several peaks are classified as arterial or venous in nature, the peaks classified as arterial are used to estimate the saturation of the arterial blood and the peaks classified as venous are used to estimate the saturation of the venous blood. The ratio of the oscillation at two wavelengths of light can be calibrated to different oxygen saturations to determine the saturation. The saturations can be used to solve Eq 1 and Eq 2 to determine the change in arterial and venous blood volume. After the blood volume signals are determined, using deterministic or blind source separation methods, those signals are further processed as described below.

Hemoglobin concentrations can be analyzed as a function of time during chest compression to determine the arterial blood volume waveforms in parallel with venous blood volume waveforms. For example, arterial blood volume waveform is derived from variation in arterial oxygen saturation, concentration of oxygenated hemoglobin and concentration of reduction hemoglobin corresponding to the measurement region (e.g., targeted artery) based on a temporal change in the amount of detected light relative to the emitted light; venous blood flow waveform is derived from variation in venous oxygen saturation, concentration of deoxygenated hemoglobin and concentration of reduction hemoglobin corresponding to the measurement region (e.g., targeted vein) based on a temporal change in the amount of detected light relative to the emitted light.

Additionally, at step 504, the patient-monitoring device can perform pre-processing of blood volume and/or blood flow waveforms substantially in real time. Real time pre-processing of blood volume and/or blood flow waveforms can include removing the DC component with a high-pass filter, amplifying the measured parameter(s), limiting the signal bandwidth with a low-pass filter and digitally sampling the measured parameter(s). It will be appreciated that the processing can provide arterial and venous blood flow and/or blood volume substantially in real-time, including within a meaningful time (e.g., in tens of seconds and preferably less than 30 seconds) to allow a user and/or mechanical chest compression device to modify chest compression rates, if needed. In some implementations, additional or other arterial and venous waveforms can be determined. Examples of additional or other arterial and venous waveforms include pressure, power, and pulse wave velocity.

At step 506, the arterial and venous blood flow and/or volume waveforms are processed to determine whether cardiac activity has been restored. For example, where the arterial and venous waveforms are monitored, identifying a portion of the waveforms can include determining an onset of a chest compression and an end of the compression (e.g., the onset of compression down-stroke and end of upstroke). Other fiducial points may also be used to determine corresponding portions of the waveforms to be analyzed. For example, each waveform can be segmented such that each period of the waveform corresponds to a chest compression. The points of interest of each period of the blood flow waveform can be extracted. The points of interest can include peaks (e.g., absolute maxima, secondary maxima, and/or local maxima) in the arterial and venous flow waveforms corresponds to the same chest compression period. In some implementations, an arterial waveform portion or point of interest is compared to a corresponding venous arterial waveform portion or point of interest and it is determined whether secondary maxima appeared. In some implementations, multiple periods of the waveform are used to differentiate true secondary maxima from signal artifacts.

In some implementations, statistical shape analysis can be used to characterize the waveform or groups of waveforms. For example, a reference portion can be generated automatically at the beginning of the chest compression treatment session or it can be obtained based on a database of waveforms. The patient monitoring device can be configured to receive a user input on that allows the user to manually initiate a new acquisition of the reference portion and/or the monitored portion. The reference portion can be determined for two or more waveforms corresponding to different arterial or venous targets (e.g., inferior vena cava, carotid artery, jugular vein, renal artery, brachial artery, femoral artery, abdominal aorta, etc.). In some implementations, the reference portion can be determined as described above, or it can correspond to 50 seconds up to 5 minutes. The time period can be configured in the non-volatile storage memory of the patient monitoring device.

In some implementations, statistical shape analysis can be employed. Such shape analysis includes methods for studying the geometrical properties of objects, such as a waveform. The constraints can be determined from historical data (e.g., by machine learning) giving the model flexibility, robustness and specificity as the model synthesizes plausible instances with respect to the observations. In order to determine whether an object (e.g., a waveform portion, or feature of the waveform) has changed shape, the shape of the object is first determined. In addition to using the shape analysis of a waveform portion, other parameters can be used in the analysis, for example, a landmark, an anatomical landmark, mathematical landmarks, etc.

In some implementations, the peaks of arterial and venous blood flow and/or volume waveforms are extracted and compared. The peaks of arterial and venous blood flow and/or volume waveforms can be automatically extracted based on waveform segmentation into periods corresponding to the chest compression periods and selection of absolute/local maxima based on peak extraction algorithms. Examples of peak extraction algorithms can include window-threshold techniques, wavelet transform, Hilbert transform, combining Hilbert and wavelet transform, artificial neural networks, morphology filtering, nonlinear filtering, Kalman filtering, Gabor filtering, Gaussian second derivative filtering, linear prediction analysis, higher-order statistics, K-Means clustering, fuzzy C-Means clustering, Empirical Mode Decomposition, hidden Markov models, and techniques using entropy, momentum, histogram/cumulative distribution function, intensity weighted variance, stochastic resonance, or a smoothed nonlinear energy operator. In response to determining that the arterial blood flow and/or volume waveform presents secondary maxima it is determined that cardiac activity is restored and an output indicating the cardiac activity restoration is generated (step 512).

At step 508, in response to determining that cardiac activity was not restored, an estimation of chest compression effectiveness is provided based on the arterial and venous blood flow and/or volume waveforms. The peak comparison of arterial and venous blood flow and/or volume includes an identification of the leading peak (arterial or venous) and a comparison of a peak of a waveform of arterial blood flow and/or volume and a peak of a waveform of venous blood flow and/or volume relative to a time line. The comparison of a peak of a waveform of arterial blood flow and/or volume to a peak of a waveform of venous blood flow and/or volume includes a calculation of a time difference between the arterial and corresponding venous peaks. The time delay can be determined by calculating the time difference between corresponding markers (e.g., peaks) of arterial and venous blood flow and/or volume waveforms. For example, the time delay can be determined by calculating the time difference between the arterial peak of a period of the arterial blood flow and/or volume waveform and the venous peak of a corresponding period of the venous blood flow and/or volume waveform. As another example, the time delay can be determined by calculating the time difference between the time at which the arterial blood flow and/or volume and the venous blood flow and/or volume are zero. For example, the time difference between the arterial and corresponding venous peaks (e.g., the time differences 226, 418 as shown in FIGS. 2B and 4B) is indicative of a change (e.g., reduction) in arterial flow, blood volume, net forward blood flow, and/or backward flow. The time difference can be used to determine the effectiveness of chest compression treatment. The greater the time difference between the arterial peak and venous peak, the more effective chest compressions are.

In some implementations, a metric E of chest compression efficiency can be determined based on the time difference between a reference point of the arterial waveform $T_A$ and a corresponding reference point of the venous waveform $T_V$ relative to the chest compression period Tcc times a normalization constant c.

$$E = \frac{c(T_A - T_V)}{T_{CC}}$$

Considering that most effective chest compressions (e.g., approximately 100% efficiency) are characterized by out of phase arterial and corresponding venous blood flow waveforms, an optimal metric (e.g., E value being approximately 1) would correspond to a time difference between the arterial waveform $T_A$ and the venous waveform $T_V$ that is half the period of a chest compression, wherein the normalization constant c=2.

At step 510, the process determines whether the forward blood flow meets a threshold based on the estimation. Determining whether the forward blood flow meets the threshold can include determining whether the metric exceeds a predetermined threshold (e.g., E is higher than approximately 60%). In some implementations, the threshold includes a volumetric flow rate value (e.g., 2-3 liters per minute). In some implementations, the threshold varies with the cardiovascular segment for which the determination is performed. For example, the threshold corresponding to cardiovascular segments that are close to the heart (e.g., carotid artery and jugular vein) is lower than the threshold for cardiovascular segments that are close to the peripheral tissue beds. Determining whether the forward blood flow meets the threshold can include determining whether the chest compression treatment is effective (efficient) or less than effective. In response to determining that the chest compression treatment is less than effective, a chest compression treatment optimization can be determined. The chest compression treatment optimization can include modification of one or more chest compression parameters (e.g., chest compression rate, compression depth magnitude, and decompression elevation level).

At step 512, the system provides feedback to the user of the device indicating the determination substantially in real-time. For example, the feedback can be provided by a user interface module (e.g., implementing the user interface of a patient monitoring device 108 of FIG. 1). In some implementations, the indicator can include a visual display on the monitoring device based on the identification of the occurrence of a feature in the arterial and venous blood flow and/or pressure waveform parameter. In some implementations, an alarm alerts a user of the device about the effectiveness of chest compression treatment. For example, the visual display can include the numerical value of the metric of the chest compression efficiency or a visual indicator (e.g., color coded or correspondingly filled up portion of a geometrical shape) representing the value of the metric of the chest compression efficiency. In some implementations, both the metronome rate and the compression prompts can be used simultaneously to guide the user in applying chest compressions at an optimized compression rate (e.g., below a ringing frequency). The ringing frequency can be determined based on an analysis of arterial/venous blood flow waveforms. For example, the ringing frequency can be determined chest compressions can generate blood flow oscillations (physiologically forward to physiologically backward). In some implementations, after initiation of the chest compression, the blood flow and/or blood volume are analyzed for at least two compression cycles before an optimization indication is provided. The ringing frequency is the inverse of the time between the peaks of consecutive oscillations. In other implementations a mechanical chest compression device can be reset to an optimized compression rate.

In some implementations, the process 500 is repeated multiple times to monitor, optimize and guide chest compression treatment until the completion of chest compression treatment. For example, the time difference between the arterial and corresponding venous peaks of multiple consecutive compressions of a plurality of compression cycles is used to determine a trend of the time difference. Based on the trend, a decrease or an increase of cardiac output and/or blood flow can be identified. For example, the action of identifying an arterial and venous feature (e.g., local maxima in blood flow waveforms, described with reference to FIGS. 2-4) and monitoring the feature can be repeated (e.g., over multiple compression cycles) and/or conducted substantially continuously during chest compression. For example, the occurrence of a feature and/or a value of the blood flow or pressure waveform parameter can be identified for each recorded compression cycle.

If compression characteristics match the defined level and a blood flow or pressure waveform parameter is measured and it indicates optimal vascular tone, chest compression can be considered adequate and no changes to the metronome and/or additional voice prompts are generated. As another example, if compression characteristics match optimal level (at step 510) but arterial and venous waveforms indicate a decrease in vascular tone, chest compression can be considered inadequate. In response to determining that chest compression protocol is inadequate, a revised rate of chest compressions can be determined and the user can be prompted to modify chest compressions based on the newly identified rate of chest compressions.

Although an example processing system has been described in FIG. 1, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, (e.g., one or more modules of computer program instructions encoded on a tangible program carrier, for example a computer-readable medium, for execution by, or to control the operation of, a processing system). The computer readable medium can be a machine-readable storage device, a machine-readable storage substrate, a memory device, or a combination of one or more of them.

The term "system" can encompass all apparatus, devices, and machines for processing data, including by way of example a programmable processor, a computer, or multiple processors or computers. A processing system can include, in addition to hardware, code that creates an execution environment for the computer program in question (e.g., code that constitutes processor firmware), a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices (e.g., EPROM, EEPROM, and flash memory devices); magnetic disks (e.g., internal hard disks or removable disks or magnetic tapes); magneto optical disks; and CD-ROM, DVD-ROM, and Blu-Ray disks. The processor and the memory can be supplemented by, or incorporated in, special purpose logic circuitry. Sometimes a server is a general-purpose computer, and sometimes it is a custom-tailored special purpose electronic device, and sometimes it is a combination of these things. Implementations can include a back end component (e.g., a data server), or a middleware component (e.g., an application server), or a front end component (e.g., a client computer having a graphical user interface) or a Web browser, through which a user can interact with an implementation of the subject matter described is this specification, or any combination of one or more such back end, middleware, or front end components. The components of the system can be interconnected by any form or medium of digital data communication. Examples of communication networks include a local area network ("LAN") and a wide area network ("WAN"), e.g., the Internet.

Many other implementations other than those described can be employed, and can be encompassed by the following claims.

What is claimed is:

1. A system for managing a chest compression treatment to a patient in need of emergency assistance by a rescuer, the system comprising:

at least one sensor configured to measure blood flow data;

one or more computer executable media comprising instructions;

one or more processors, in communication with the at least one sensor, configured to execute the instructions by performing operations comprising:

receiving the blood flow data from the at least one sensor, based on the blood flow data, generating arterial blood flow data and venous blood flow data, determining an arterial blood flow peak based on the generated arterial blood flow data, wherein the arterial blood flow peak comprises a prominent peak among the generated arterial blood flow data for a compression cycle of the chest compression treatment, determining a venous blood flow peak based on the generated venous blood flow data, wherein the venous blood flow peak comprises a prominent peak among the generated venous blood flow data for the compression cycle of the chest compression treatment, providing an estimation of chest compression effectiveness based on the determined arterial blood flow peak and the venous blood flow peak, the estimation being based on a comparison of a time difference between the arterial blood flow peak and the venous blood flow peak, and generating an output indication of the estimation of chest compression effectiveness; and an output device configured to provide the output indication for the rescuer.

2. The system of claim 1, wherein the operations comprise:

determining whether a cardiac activity was restored during the chest compression treatment.

3. The system of claim 2, wherein determining whether the cardiac activity was restored comprises:

identifying peaks of the arterial blood flow data; and determining an absence of peaks of the venous blood flow data that correspond to the identified peaks of the arterial blood flow data.

4. The system of claim 1, wherein the comparison of the time difference between the arterial blood flow peak and venous blood flow peak comprises a comparison of an arterial peak of an arterial blood flow waveform corresponding to a chest compression period and a venous peak of a venous blood flow waveform corresponding to the chest compression period.

5. The system of claim 1, wherein the operations comprise:

based on the estimation, determining whether the forward blood flow meets a criterion based on the comparison of the arterial peak to the venous peak.

6. The system of claim 1, wherein determining whether the forward blood flow meets the criterion comprises determining whether the arterial blood flow peak occurs before the venous blood flow peak.

7. The system of claim 6, wherein the criterion comprises a comparison with a threshold.

8. The system of claim 7, wherein the threshold comprises a time delay value, a chest compression efficiency metric, or a volumetric flow rate value.

9. The system of claim 1, wherein the at least one sensor comprises at least one of a photoplethysmographic sensor, an ultrasound sensor, and/or a blood flow sensor.

10. The system of claim 1, wherein the at least one sensor is configured to identify oxygenated blood data and deoxygenated blood data, the oxygenated blood data being used to generate the arterial blood flow data and the deoxygenated blood data being used to generate the venous blood flow data.

11. The system of claim 1, comprising:

a 750 nm light-emitting diode (LED) for a venous target having a first absorbance that is dominated by de-oxy hemoglobin; and a 850 nm LED for a 850 nm arterial target having a second absorbance that is dominated by oxy-hemoglobin.

12. The system of claim 11, wherein the first absorbance and the second absorbance are measured using a computer-controlled spectrometer coupled to a fiber optic cable and collimating lens.

13. The system of claim 12, wherein the computer-controlled spectrometer operates at approximately 256 samples per second.

14. The system of claim 11, wherein LEDs and fiber optic collimating lens are affixed to the patient at a set distance from one another.

15. The system of claim 1, wherein the system is configured to be coupled to a defibrillator or a mechanical chest compression device connected to the patient.

16. The system of claim 1, wherein the operations comprise:
receiving the blood volume data from the at least one sensor,
based on the blood volume data, generating oxygenated blood volume data and de-oxygenated blood volume data,
providing an estimation of chest compression effectiveness based on the arterial blood flow data, the venous blood flow data, the oxygenated blood volume data, and the de-oxygenated blood volume data.

17. The system of claim 1, wherein the output indication comprises feedback for the rescuer of chest compression effectiveness displayed on a screen of a medical device.

18. The system of claim 1, wherein the time difference comprises a time displacement between the arterial blood flow peak and the venous blood flow peak.

19. The system of claim 1, wherein at least one of the prominent peak among the generated arterial blood flow data or the prominent peak among the generated venous blood flow data is determined based on correlating timing from an actual chest compression of the chest compression treatment to one or more local maxima or minima on at least one of the arterial blood flow data and the venous blood flow data.

20. A method of detecting net forward blood flow during cardiopulmonary resuscitation (CPR) in a patient, the method comprising:
receiving, by one or more processors and from at least one sensor, blood flow data,
based on the blood flow data, generating, by the one or more processors, arterial blood flow data and venous blood flow data,
determining an arterial blood flow peak based on the generated arterial blood flow data, wherein the arterial blood flow peak comprises a prominent peak among the generated arterial blood flow data for a compression cycle of the chest compression treatment,
determining a venous blood flow peak based on the generated venous blood flow data, wherein the venous blood flow peak comprises a prominent peak among the generated venous blood flow data for the compression cycle of the chest compression treatment,
providing, by the one or more processors, an estimation of forward blood flow based on the arterial blood flow peak and the venous blood flow peak, the estimation being based on a comparison of a time difference between the arterial blood flow peak and the venous blood flow peak,
generating, by the one or more processors, an output indication of the estimation of the forward blood flow; and
providing, by the one or more processors, the output indication to be displayed to the rescuer.

21. The method of claim 20, wherein the arterial blood flow data and the venous blood flow data are simultaneously measured at an upper circulatory system location and at a lower upper circulatory system location.

22. The method of claim 20, wherein arterial and venous blood flow data are measured using a photoplethysmographic sensor, an ultrasound sensor, or a blood flow sensor.

23. The method of claim 20, wherein a net forward blood flow indicates that the chest compressions are effective.

24. The method of claim 20, comprising:
based on the estimation, determining whether the forward blood flow meets a criterion based on the comparison of the arterial blood flow peak to the venous blood flow peak.

25. The method of claim 20, comprising:
in response to determining whether the forward blood flow meets the criterion, adjusting a compression rate or a compression depth.

26. The method of claim 25, wherein net forward blood flow is improved by applying chest compressions to the patient below a ringing frequency corresponding to patient's blood flow oscillations.

27. The method of claim 20, wherein the time difference comprises a time displacement between the arterial blood flow peak and the venous blood flow peak.

28. The method of claim 20, wherein at least one of the prominent peak among the generated arterial blood flow data or the prominent peak among the generated venous blood flow data is determined based on correlating timing from an actual chest compression of the chest compression treatment to one or more local maxima or minima on at least one of the arterial blood flow data and the venous blood flow data.

29. A system for managing a chest compression treatment to a patient in need of emergency assistance by a rescuer, the system comprising:
at least one sensor configured to measure blood volume data;
one or more computer executable media comprising instructions;
one or more processors, in communication with the at least one sensor, configured to execute the instructions by performing operations comprising:
receiving the blood volume data from the at least one sensor,
based on the blood volume data, generating oxygenated blood volume data and de-oxygenated blood volume data,
determining an oxygenated blood volume peak based on the generated oxygenated blood volume data, wherein the oxygenated blood volume peak comprises a prominent peak among the generated oxygenated blood volume data for a compression cycle of the chest compression treatment;
determining a de-oxygenated blood volume peak based on the generated de-oxygenated blood volume data, wherein the de-oxygenated blood volume peak comprises a prominent peak among the generated de-oxygenated blood volume data for the compression cycle of the chest compression treatment;
providing an estimation of chest compression effectiveness based on the oxygenated blood volume peak and the de-oxygenated blood volume peak, the estimation being based on a comparison of a time difference between the oxygenated blood volume peak and the de-oxygenated blood volume peak, and
generating an output indication of the estimation of chest compression effectiveness; and
an output device configured to provide the output indication to the rescuer.

30. The system of claim 29, wherein the operations comprise: determining whether a cardiac activity was restored during the chest compression treatment.

31. The system of claim 30, wherein determining whether the cardiac activity was restored comprises:
identifying peaks of the oxygenated blood volume data; and determining an absence of peaks of the de-oxygenated blood volume data that correspond to the identified peaks of the oxygenated blood volume data.

32. The system of claim 29, wherein the comparison of the time difference between the oxygenated blood volume peak and de-oxygenated blood volume peak comprises a comparison of a peak of an oxygenated blood volume waveform corresponding to a chest compression period and a peak of a de-oxygenated blood volume waveform corresponding to the chest compression period.

33. The system of claim 29, wherein the operations comprise:

based on the estimation, determining whether the forward blood flow meets a criterion based on the comparison of the peak of the oxygenated blood volume waveform to the peak of the de-oxygenated blood volume waveform.

34. The system of claim 29, wherein determining whether the forward blood flow meets the criterion comprises determining whether the peak of the oxygenated blood volume waveform occurs before the peak of the de-oxygenated blood volume waveform.

35. The system of claim 34, wherein the criterion comprises a comparison with a threshold.

36. The system of claim 35, wherein the threshold comprises a time delay value, a chest compression efficiency metric, or a volumetric flow rate value.

37. The system of claim 29, wherein the at least one sensor comprises a photoplethysmographic sensor, an ultrasound sensor, and/or a blood flow sensor.

38. The system of claim 29, wherein the at least one sensor is configured to identify oxygenated blood data and deoxygenated blood data.

39. The system of claim 29, comprising:

a 750 nm light-emitting diode (LED) for a venous target having a first absorbance that is dominated by de-oxy hemoglobin; and a 850 nm LED for a 850 nm arterial target having a second absorbance that is dominated by oxy-hemoglobin.

40. The system of claim 39, wherein the first absorbance and the second absorbance are measured using a computer-controlled spectrometer coupled to a fiber optic cable and collimating lens.

41. The system of claim 40, wherein the computer-controlled spectrometer operates at approximately 256 samples per second.

42. The system of claim 39, wherein LEDs and collimating lens are affixed to the patient at a set distance from one another.

43. The system of claim 29, wherein the system is configured to be coupled to a defibrillator or a mechanical chest compression device connected to the patient.

44. The system of claim 26, wherein the operations comprise:

receiving the blood flow data from the at least one sensor, based on the blood flow data, generating arterial blood flow data and venous blood flow data, providing an estimation of chest compression effectiveness based on the arterial blood flow data, the venous blood flow data, the oxygenated blood volume data, and the de-oxygenated blood volume data.

45. The system of claim 29, wherein the output indication comprises feedback for the rescuer of chest compression effectiveness displayed on a screen of a medical device.

46. The system of claim 29, wherein the time difference comprises a time displacement between the oxygenated blood volume peak and the de-oxygenated blood volume peak.

47. A method of detecting net forward blood flow during cardiopulmonary resuscitation (CPR) in a patient, the method comprising:

receiving, by one or more processors and from at least one sensor, blood volume data, based on the blood volume data, generating, by the one or more processors, oxygenated blood volume data and de-oxygenated blood volume data, determining an oxygenated blood volume peak based on the generated oxygenated blood volume data, determining a de-oxygenated blood volume peak based on the generated de-oxygenated blood volume data, providing, by the one or more processors, an estimation of forward blood flow based on the oxygenated blood volume peak and the de-oxygenated blood volume peak, the estimation being based on a comparison of a time difference between the oxygenated blood volume peak and the de-oxygenated blood volume peak, generating, by the one or more processors, an output indication of the estimation of forward blood flow; and providing, by the one or more processors, the output indication to be displayed to the rescuer.

48. The method of claim 47, wherein the oxygenated blood volume data and the de-oxygenated blood volume data are simultaneously measured at an upper circulatory system location and at a lower upper circulatory system location.

49. The method of claim 47, wherein oxygenated and de-oxygenated blood volume data are measured using a photoplethysmographic sensor, an ultrasound sensor, or a blood flow sensor.

50. The method of claim 47, wherein a net forward blood flow indicates that the chest compressions are effective.

51. The method of claim 47, comprising:

based on the estimation, determining whether the forward blood flow meets a criterion based on the comparison of an oxygenated blood volume peak to a de-oxygenated blood volume peak.

52. The method of claim 47, comprising:

in response to determining whether the forward blood flow meets the criterion, adjusting a compression rate or a compression depth.

53. The method of claim 52, wherein net forward blood flow is improved by applying chest compressions to the patient below a ringing frequency corresponding to patient's blood flow oscillations.

54. The method of claim 47, wherein the time difference comprises a time displacement between the oxygenated blood volume peak and the de-oxygenated blood volume peak.

* * * * *